United States Patent
Fink

(10) Patent No.: US 11,110,878 B2
(45) Date of Patent: Sep. 7, 2021

(54) VEHICULAR TIP OR ROLLOVER PROTECTION MECHANISMS

(71) Applicant: Arizona Board of Regents on Behalf of the University of Arizona, Tucson, AZ (US)

(72) Inventor: Wolfgang Fink, Montrose, CA (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 67 days.

(21) Appl. No.: 16/282,249

(22) Filed: Feb. 21, 2019

(65) Prior Publication Data
US 2019/0256030 A1 Aug. 22, 2019

Related U.S. Application Data

(60) Provisional application No. 62/633,561, filed on Feb. 21, 2018.

(51) Int. Cl.
*B60R 21/13* (2006.01)
*B60R 21/00* (2006.01)

(52) U.S. Cl.
CPC ...... *B60R 21/13* (2013.01); *B60R 2021/0018* (2013.01)

(58) Field of Classification Search
CPC .......... B60R 2021/13; B60R 2021/132; B60R 2021/134–135; B60R 2021/137–138; B60R 2021/0018; B60R 21/13; B60R 21/23184; B60R 49/08; B60R 21/34; B60R 21/36; B60R 2021/346; B62D 49/08
See application file for complete search history.

(56) References Cited

U.S. PATENT DOCUMENTS 4,973,082 A * 11/1990 Kincheloe ............... B60R 21/13
280/756
5,224,735 A * 7/1993 Jambor ................... B60R 21/13
280/756

(Continued)

FOREIGN PATENT DOCUMENTS

CN 104118387 A * 10/2014

OTHER PUBLICATIONS

Zhao et al., Side overturning protecting and righting device and method and passenger car with the same, Oct. 29, 2014, EPO, CN 104118387 A, English Abstract (Year: 2014).*

(Continued)

*Primary Examiner* — James A English
(74) *Attorney, Agent, or Firm* — Thomas | Horstemeyer, LLP

(57) ABSTRACT

Various examples are provided related to tip or rollover protection mechanisms for ground vehicles. In one example, a vehicle includes a vehicle frame and one or more protection mechanism(s) secured to the vehicle frame. The protection mechanism can allow the vehicle to "land" right-side up after tipping or rolling over for continuing operation. This can be beneficial for, but not limited to, autonomous or remotely controlled vehicles. The protection mechanism can include protection mechanisms secured to opposite sides of the vehicle frame. The protection mechanism can be passive, active, actuated or a combination thereof.

20 Claims, 22 Drawing Sheets

(56) References Cited

U.S. PATENT DOCUMENTS

| | | | | |
|---|---|---|---|---|
| 6,394,738 | B1* | 5/2002 | Springer | B62D 49/08 |
| | | | | 187/232 |
| 6,764,124 | B2* | 7/2004 | Tohda | B60R 21/13 |
| | | | | 280/756 |
| 7,828,106 | B1* | 11/2010 | Ratajski | B60R 21/13 |
| | | | | 180/282 |
| 7,954,878 | B1* | 6/2011 | Hinton | B60R 21/13 |
| | | | | 296/104 |
| 9,573,547 | B2* | 2/2017 | Friedeman | B60R 21/02 |
| 9,889,810 | B2* | 2/2018 | Yoshimura | B62D 23/005 |
| 10,086,787 | B1* | 10/2018 | Akhlaque-e-rasul | B60R 21/13 |
| 2002/0114941 | A1* | 8/2002 | Franke | B62K 19/16 |
| | | | | 428/320.2 |
| 2003/0042722 | A1* | 3/2003 | Hovelmann | B60R 21/13 |
| | | | | 280/756 |
| 2008/0122209 | A1* | 5/2008 | Jayasuriya | B60R 3/002 |
| | | | | 280/755 |
| 2009/0278342 | A1* | 11/2009 | Browne | B60R 21/13 |
| | | | | 280/756 |
| 2011/0221177 | A1* | 9/2011 | Srabstein | B62J 17/08 |
| | | | | 280/756 |
| 2016/0200275 | A1* | 7/2016 | Le Merrer | B60R 21/0134 |
| | | | | 701/45 |
| 2016/0214557 | A1* | 7/2016 | Villa | B60R 21/0132 |

OTHER PUBLICATIONS

Zhao et al., Side overturning protecting and righting device and method and passenger car with the same, Oct. 29, 2014, EPO, CN 104118387 A, Machine Translation of Description (Year: 2014).*

* cited by examiner

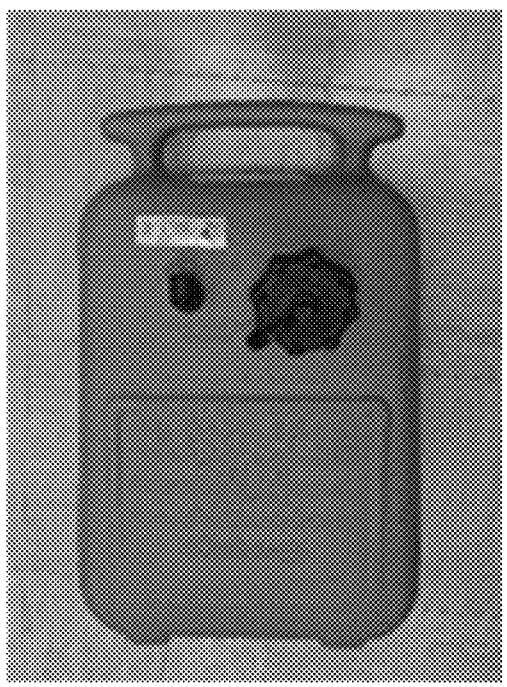
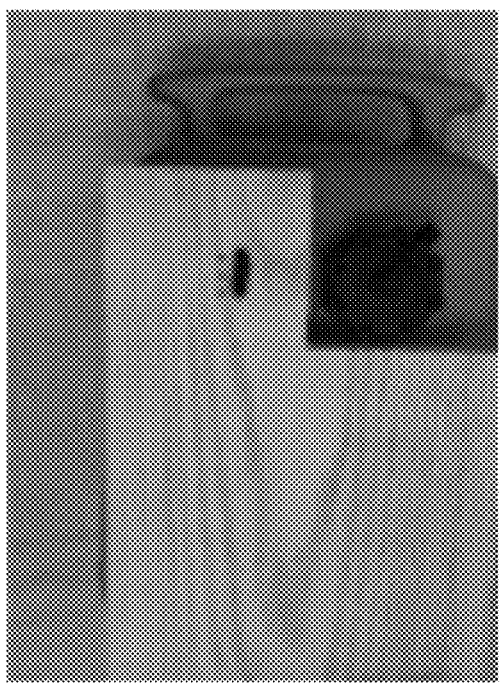
FIG. 3A  FIG. 3B
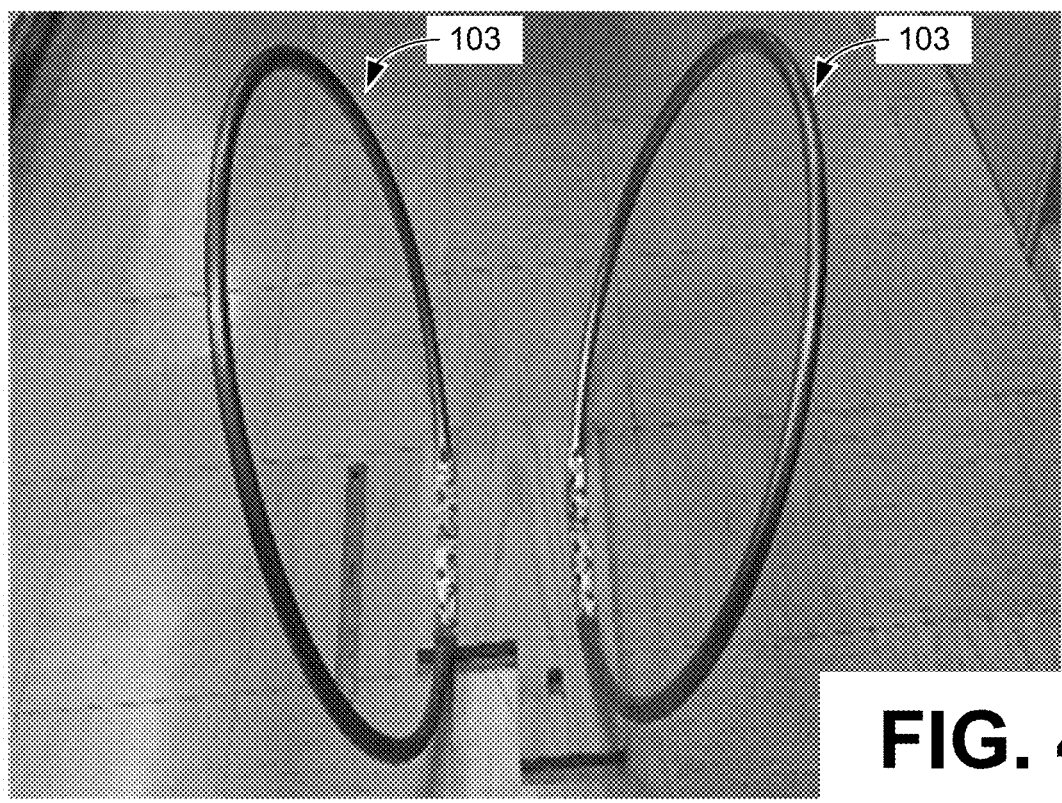
FIG. 4

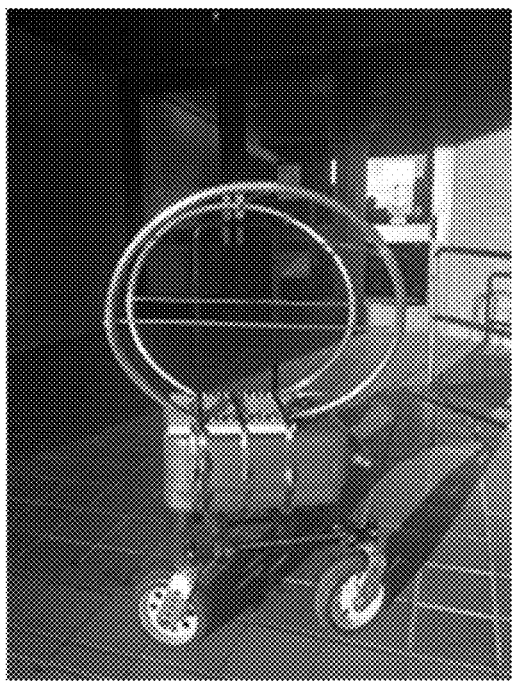 
FIG. 7A FIG. 7B
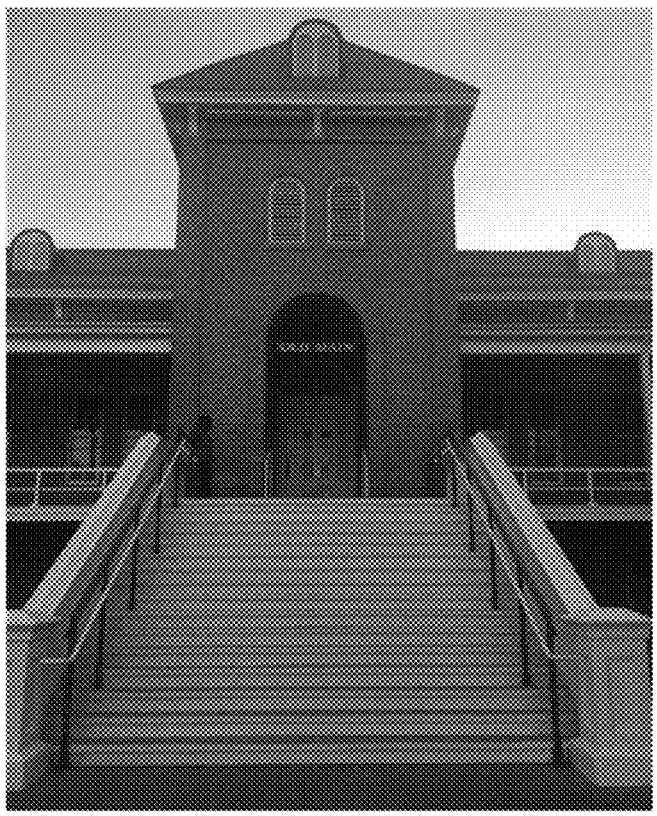
FIG. 8A

VEHICULAR TIP OR ROLLOVER PROTECTION MECHANISMS

CROSS REFERENCE TO RELATED APPLICATIONS

This application claims priority to, and the benefit of, U.S. provisional application entitled "Vehicular Tip or Rollover Protection Mechanisms" having Ser. No. 62/633,561, filed Feb. 21, 2018, which is hereby incorporated by reference in its entirety.

BACKGROUND

Ground-based vehicles, upon traversing (steep) slopes are subject to tip or rollover threats. For example, planetary surface exploration missions are conducted with rovers that are historically and currently confined to regions that are safe to traverse in order to fulfill the primary mission goals. This approach (or mentality) has paid off as far as mission longevity is concerned, but may have also prevented the discovery of exciting science in hard to get to or risky terrain.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A and 3B are images of the water-filled container used as the rover surrogate, in accordance with various embodiments of the present disclosure.

FIG. 4 is an image of an example of a tip or rollover protection (or safeguard) mechanism, in accordance with various embodiments of the present disclosure.

FIGS. 7A and 7B are images of the rover surrogate with the water-filled container and the tip or rollover protection (or safeguard) mechanism of FIGS. 5D and 5E positioned on the container for testing, in accordance with various embodiments of the present disclosure.

FIGS. 8A and 8B are images of the steep stairs used for testing of the rover surrogate of FIGS. 7A and 7B, in accordance with various embodiments of the present disclosure.

DETAILED DESCRIPTION

Figure 1A:
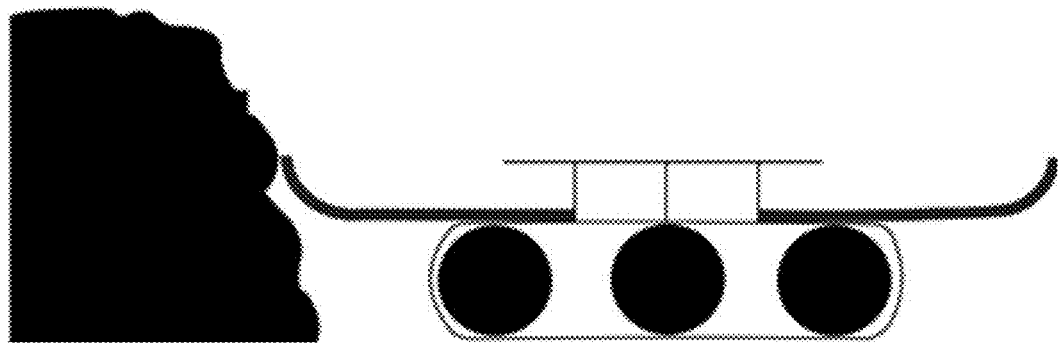
FIGS. 1A and 1B illustrate an example of a passive protection (or safeguard) mechanism, in accordance with various embodiments of the present disclosure.

Disclosed herein are various examples related to tip or rollover protection mechanisms for ground vehicles, or combinations thereof, such as flipping, tumbling, etc. This disclosure presents protection mechanisms based on tip or rollover safeguards using, e.g., cross-stabilizing beams/struts, for ground-based vehicles (e.g., planetary rovers) that either prevent tipping or rollover situations from happening, or in cases where they do occur, lead to a benign outcome. For instance, the ground-based vehicle is configured to "land" right-side up for continuing operation. This can be especially useful, or even necessary, for autonomously operating and/or tele-commanded vehicles, e.g., on planetary surfaces or in remote areas (e.g., military theatres, natural disaster stricken areas, contaminated areas, etc.). For example, this can be applied to vehicles, such as, but not limited to, automobiles (e.g., cars, trucks, etc.), planetary rovers, toy vehicles (e.g., radio controlled or automated cars), or other robotic ground vehicles. Reference will now be made in detail to the description of the embodiments as illustrated in the drawings, wherein like reference numbers indicate like parts throughout the several views.

Planetary surface exploration missions to planetary bodies other than Earth up to now have been conducted with a single spacecraft, i.e., rovers or landers. As such, these missions did not exhibit redundancy and thus did not exhibit robustness. As a consequence, and out of necessity, these missions have spent tremendous effort on ensuring safe spacecraft landings, i.e., landings in benign terrain to warrant a subsequent mission for planetary surface exploration.

As a recent example, the Mars Science Laboratory (MSL) mission, which delivered the Curiosity rover to the "Bradbury Landing" site in Gale Crater, Mars, on Aug. 6, 2012, was preceded by mapping efforts of terrain types from orbit (e.g., through the Mars Reconnaissance Orbiter (MRO)) to support mission planning, both for deciding targets to be investigated and for anticipating issues of traversing terrains. The latter issues include the problem of steep slopes, such as occur on the slip faces of sand dunes, as well as potentially damaging zones of rugged rock.

To enable the exploration of high-risk sites, several designs of one or more tip or rollover safeguard mechanism(s) are qualitatively discussed for planetary rovers, and the testing of one such prototyped safeguard design is reported. The protection mechanisms can also be utilized for other types of ground vehicles, such as, e.g., automobiles, etc. that may be used in various situations over a range of risk levels.

Geologic Approach and Need to Explore High-Risk Sites

In doing field geology on Earth the geological investigator has the benefit of an interplay between (1) detailed examination of samples and rock outcrops, and (2) compilations of regional syntheses, most effectively achieved through geological mapping. The mode of geological field studies is investigative, and is particularly focused on the making of discoveries. The latter are not readily accomplished by the testing of preconceived hypotheses. Instead, new hypotheses can be generated by focusing on anomalies, i.e., those features that do not fit with preconceived hypotheses because of their identification by means of the investigative approach. The new hypotheses can be formulated in accord with the investigator's experience with analogues to the phenomenon discovered. They become "working hypotheses" that can be judged by their productivity or fruitfulness in leading the investigation along to further productive inquiry.

Geologists commonly make their field discoveries at outcrops, which are the locations where rocks and strata are best exposed. However, the best outcrops can occur, e.g., on steep slopes, at the bases of cliffs, along canyon walls, in caves, and at other sites that pose extreme danger, i.e., high risk, to robotic exploration vehicles. However, denial of access to such sites will "block the way of inquiry" which effectively means that the scientific process noted above will be compromised, which, in effect, logically defeats that process. If a field geological investigation is to be truly scientific, it must be able to access all accessible outcrops, regardless of whether they pose a high risk or not. This means that the robotic investigative robot must either be equipped to minimize its risk at dangerous outcrops, or it must be part of a team of such robots—e.g., as part of a Tier-Scalable Reconnaissance mission architecture—such that the loss of some team members can be tolerated in the quest to achieve the maximum possible science return.

Relevance to NASA's Space Technology Grand Challenges

The tip or rollover protection mechanism disclosed herein directly addresses one of NASA's Space Technology Grand Challenges—"All Access Mobility." "Create mobility systems that allow humans and robots to travel and explore on, over or under any destination surface." The problem is stated as follows: "Exploration of comets, asteroids, moons and planetary bodies is limited by mobility on those bodies. Current robotic and human systems cannot safely traverse a number of prevalent surface terrains. Current systems travel slowly, requiring detailed oversight and planning activities. Consequently, these systems are often limited to exploring areas close to their original landing site." As such the disclosed approach has the potential to enable radical exploration of riskier terrains for potential science return that may not be attainable when confining the mission to safer terrains.

Considerations for Tip or Rollover Safeguards

There are some basic/general guidelines for an effective tip or rollover protection mechanism. For example, the safeguard needs to either prevent tip or rollover altogether, i.e., passive protection, or to mitigate damage from unavoidable tip or rollover situations (that are expected during exploration of high-risk sites) while attempting to right the rover afterwards for continued operation, i.e., active protection. Both passive and active safeguard designs, e.g., could be of relatively low mass to not take away from the overall mission payload. Moreover, neither one of the safeguard designs should obstruct the operation of onboard instruments and measurements. Last but not least, access to surface targets, such as rocks and (canyon) walls, should not be reduced. While the following examples of one or more tip or rollover protection mechanism(s) are presented with respect to planetary exploration vehicles, they may be applied to other types of vehicles as well, such as ground vehicles.

Figure 1B:
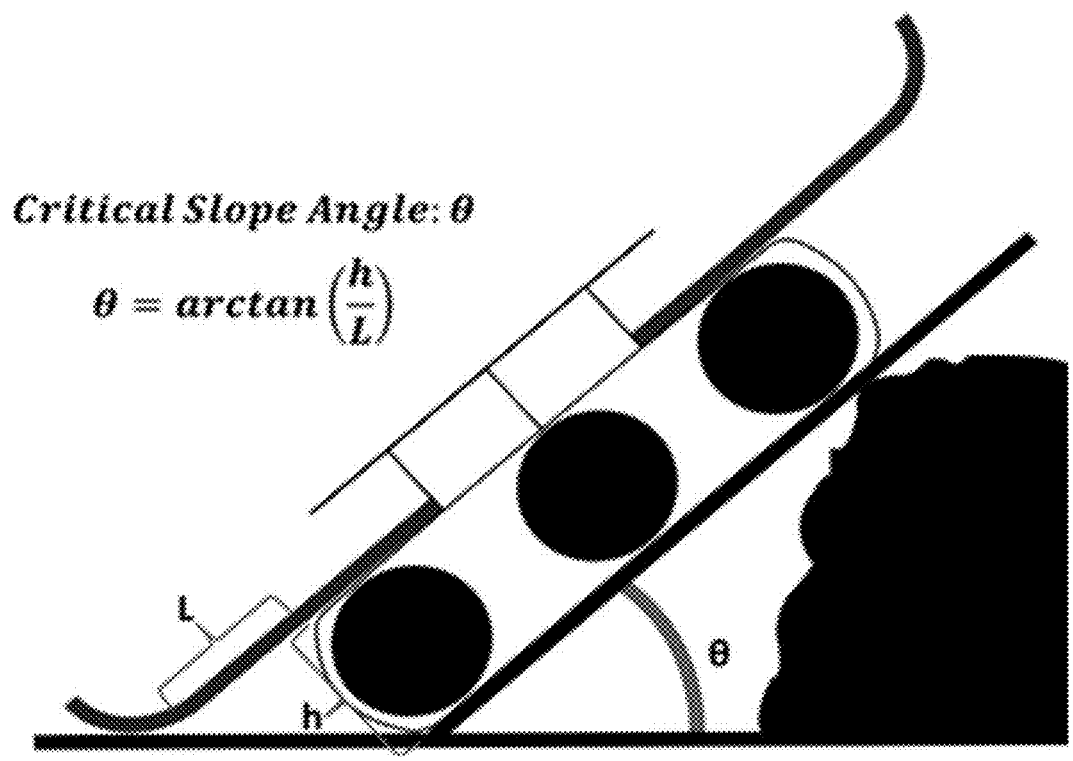
Figure 1C:
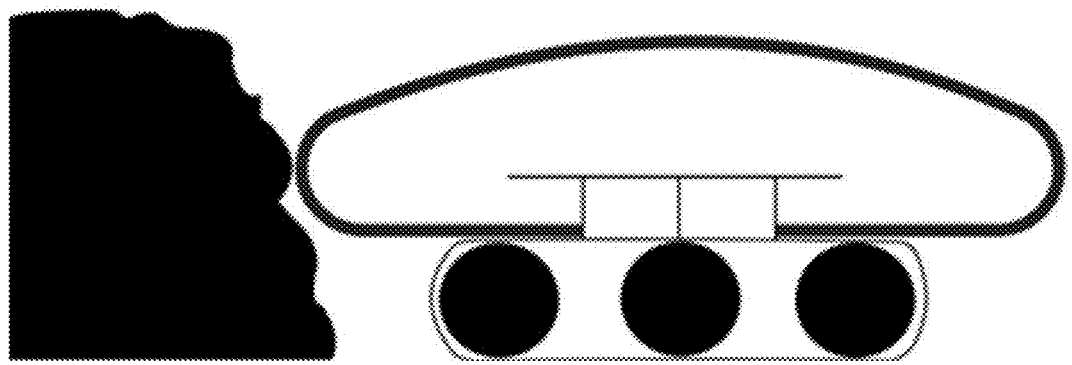
FIGS. 1C-1E illustrate examples of active protection (or safeguard) mechanisms, in accordance with various embodiments of the present disclosure.
Figure 1D:
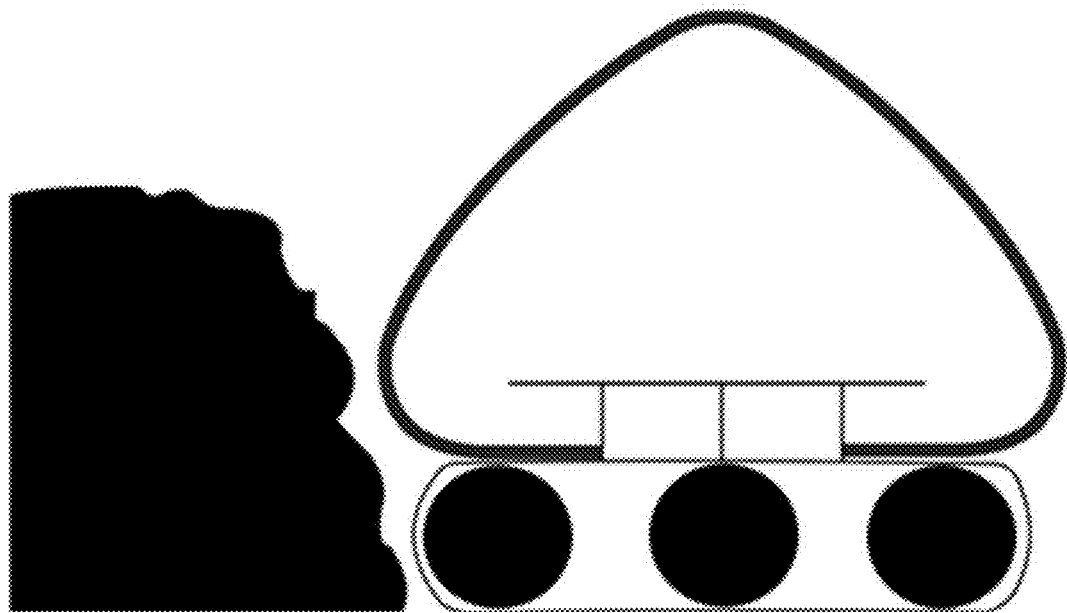
Figure 1E:
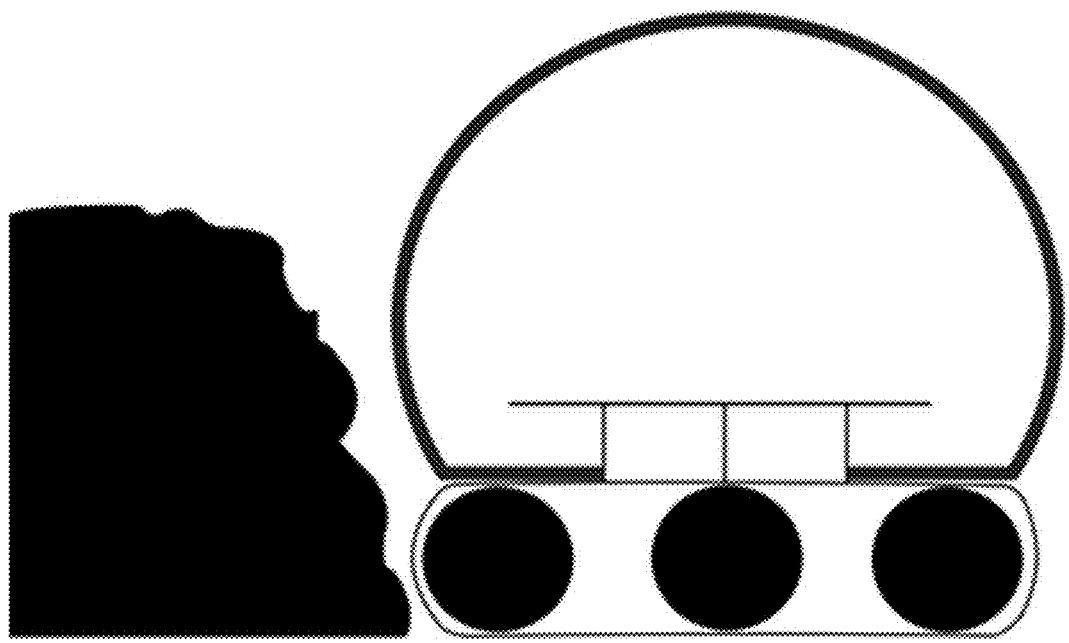
Figure 1F:
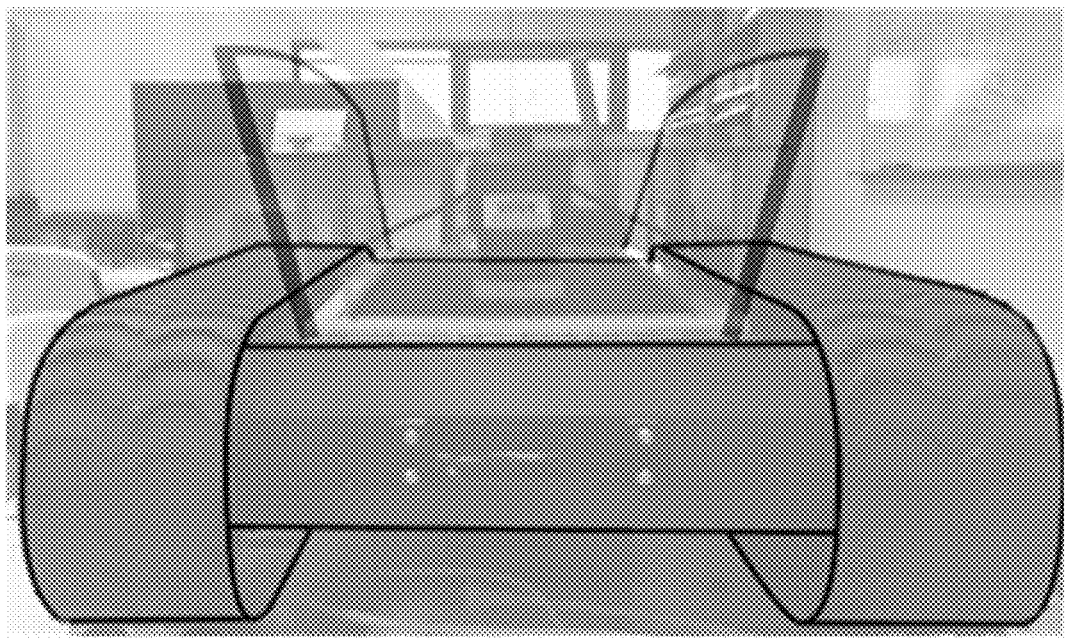
FIG. 1F illustrates a lateral cross-section of a rover including an example of an active protection (or safeguard) mechanism, in accordance with various embodiments of the present disclosure.

Qualitative Tip or Rollover Safeguard Design Discussion. FIGS. 1A-1F help illustrate the relative strengths and weaknesses of several qualitative safeguard designs. FIG. 1A shows an example of a passive tip or rollover protection mechanism, and FIG. 1B illustrates the potential navigational limitations of the design. When the critical angle ($\theta$) is exceeded, the safeguard will make ground contract as shown in FIG. 1B. FIGS. 1C-1E illustrate examples of active tip or rollover safeguard designs. The object to the left of the rover in FIGS. 1A, 1C-1E denotes a surface target, such as a rock or (canyon) wall. The location of the rock with respect to the rovers shows the proximity limitations of each safeguard design. FIG. 1F illustrates the lateral cross-section of a rover. The V-shaped safeguard enhances the lateral stability of the design. Other arrangements or configurations can also be used to enhance stability of the design.

Design #1 (FIG. 1A) is an example of a passive protection mechanism. Its purpose is to prevent a tip or rollover from happening in first place. The maximum, traversable critical slope angle ($\theta$) is determined by the height and length of the safeguards (FIG. 1B). If the rover exceeds this critical slope angle ($\theta$) and flips over, the situation is irrecoverable and the mission is over. Access to surface targets may be reduced because of the reduced proximity to the targets caused by the safeguards sticking out to either side of the rover. The potential advantages include, but are not limited to, its simple construction and its low mass because less material is needed.

Design #2 (FIG. 1C) is an example of an active protection mechanism. Its purpose is to prevent a tip or rollover because of the small curvature radii to either side of the rover that would cause it to roll right back. However, if a tip or rollover situation were to occur, one or more complete revolution(s) could be performed, thus recovering the mission. Because of the large curvature radius on the top part of the safeguards, there is a risk that the rover would come to rest upside down if the tip or rollover velocity is too low to complete a full revolution, thus ending the mission. Because of the small curvature radii to either side of the rover, a "slamming" of the rover to the ground would occur when it is in an orthogonal position (90 degrees) with respect to the ground. Access to surface targets may be reduced because of the reduced proximity to the targets caused by the safeguards sticking out to either side of the rover.

Design #3 (FIG. 1D) is another example of an active protection mechanism. Its purpose is to prevent a tip or rollover because of the small curvature radii to either side of the rover that would cause it to roll right back. However, if a tip or rollover situation were to occur, one or more complete revolution(s) could be performed. As opposed to designs #1 and #2, access to surface targets is not affected. Because of the small curvature radius on the top part of the safeguards, the risk of ending up in an upside down position is reduced as this position will likely be rendered dynamically unstable. However, because of the small curvature radius on the top part of the safeguards, there is a risk that the initial rover tip or rollover velocity may increase (i.e., momentum gain) once past this top-most point, which worsens also the following point. Because of the small curvature radii to either side of the rover, a "slamming" of the rover to the ground can occur when it is in an orthogonal position (90 degrees) with respect to the ground. Also the taller safeguard height may utilize more material, resulting in more mass.

Design #4 (FIG. 1E) is another example of an active protection mechanism. Its purpose is to prevent a tip or rollover because of the curvature radii to either side of the rover that would cause it to roll right back. However, if a tip or rollover situation were to occur, one or more complete revolution(s) could be performed. As opposed to designs #1 and #2, access to surface targets is not affected. Because of the homogeneous, large curvature radius along the entire safeguards (as opposed to designs #2 and #3), the risk of ending up in an upside down position can be reduced. As opposed to design #3, no acceleration of the initial rover tip or rollover velocity (i.e., no momentum gain) is expected. Because of the homogeneous, large curvature radius along the entire safeguards, no "slamming" effect is expected towards the end phase of one or multiple complete revolution(s). The taller safeguard height may utilize more material, resulting in more mass.

Common to all active protection mechanisms detailed above (i.e., designs #2, #3, and #4), FIG. 1F shows a lateral cross-section through the safeguards and exhibits a V-shape for added lateral stability during a potential tip or rollover situation. Other arrangements or configurations can be used to provide the added stability.

Technical Approach and Test Setup

Given the characteristics of the respective safeguard designs, a prototype of a tip or rollover safeguard was constructed according to the example of design #4 (FIG. 1E). The prototyping steps are detailed below.

Figure 2A:
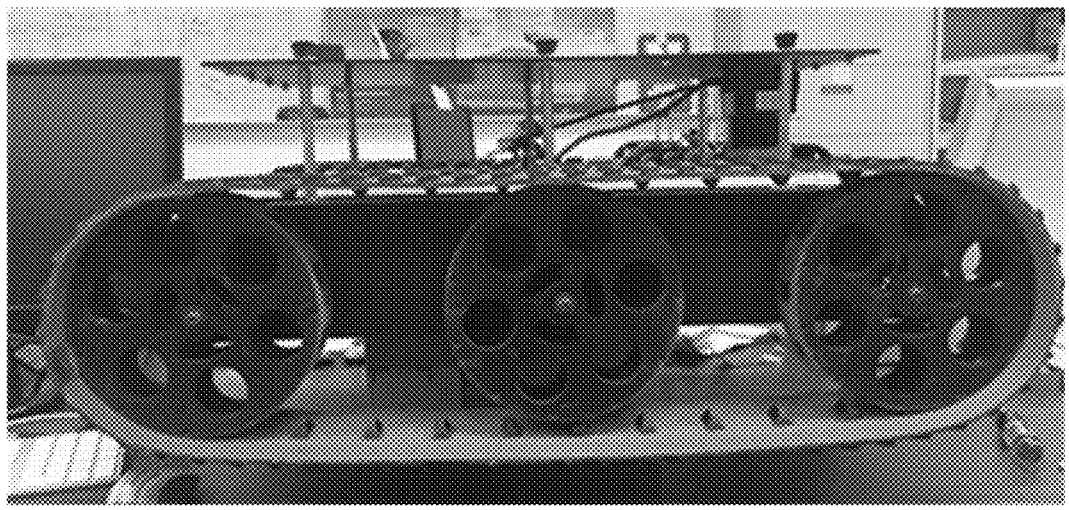
FIGS. 2A-2E illustrate the justification for approximating a real-world rover with a 22.7 L water-filled container, in accordance with various embodiments of the present disclosure.
Figure 2B:
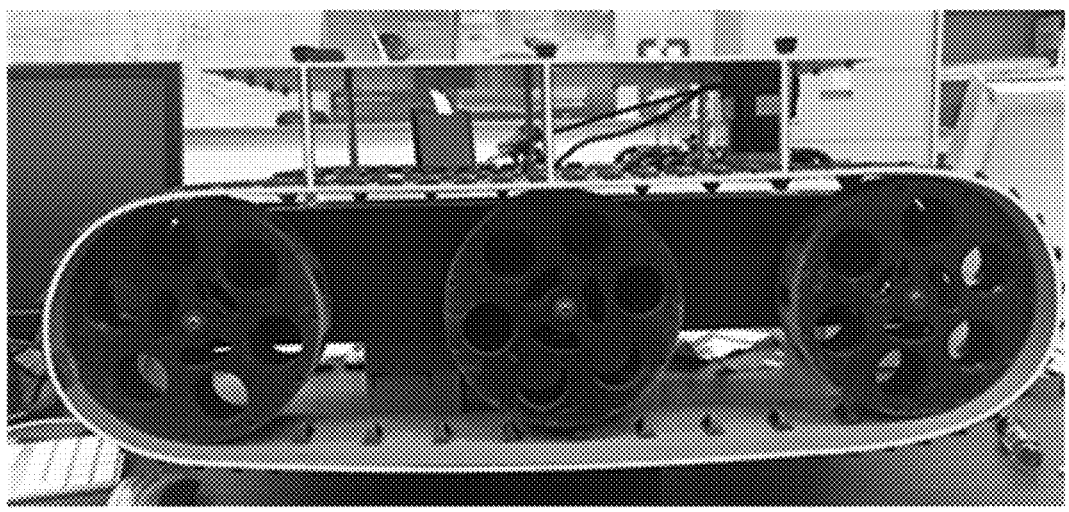
Figure 2C:
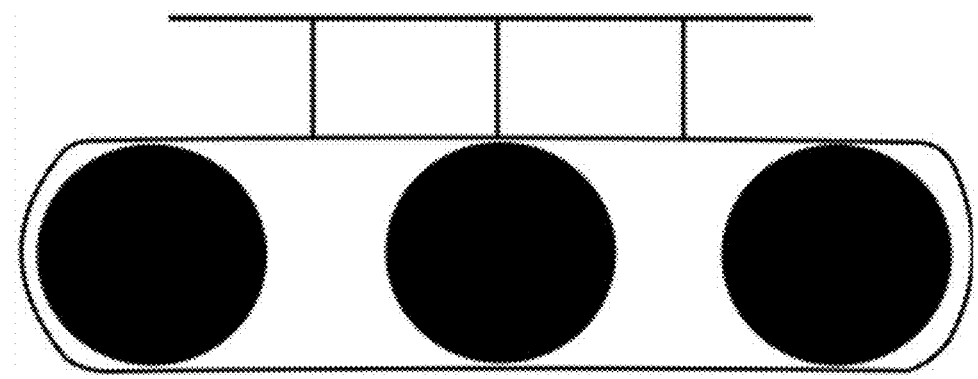
Figure 2D:
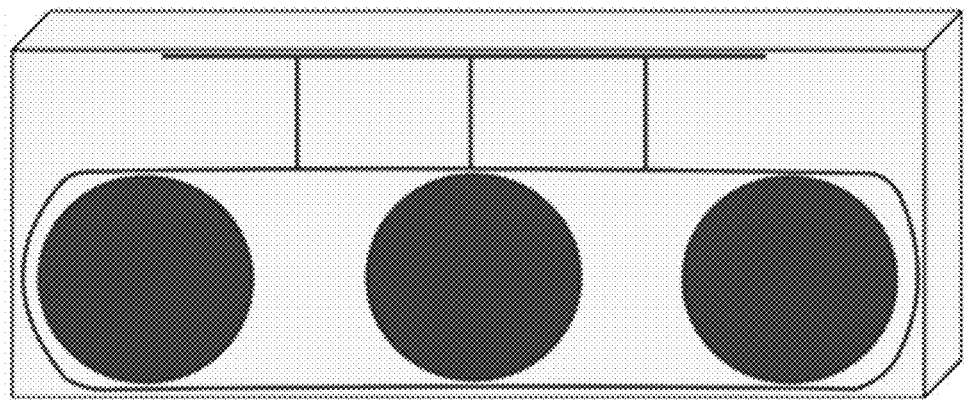
Figure 2E:
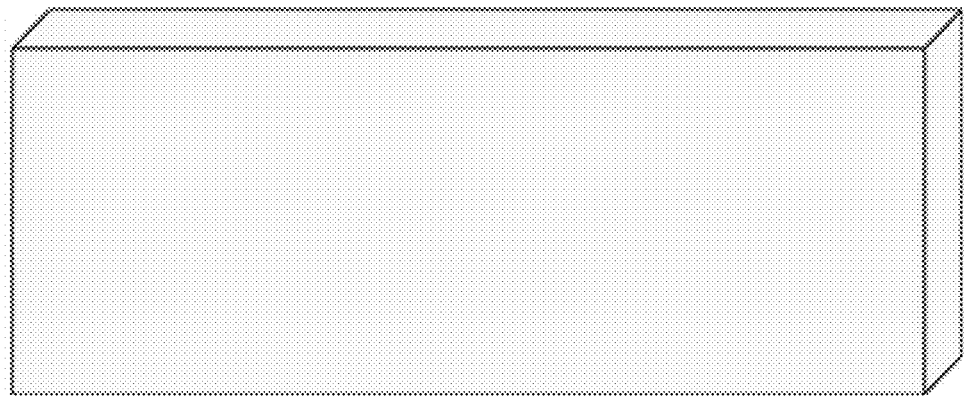

Water-filled Container as a Surrogate for the Rover. Note that the rover is much heavier than the disclosed rover safeguard designs of FIGS. 1A-1E. As such, any tests assessing protective reorientation and durability capabilities of a design require the use of an actual rover, or a substitute with identical or similar physical attributes. A 22.7 L water-filled container mounted to a wooden board via steel zip ties was used as a surrogate for the rover. Justification for approximating the real-world rover with the 22.7 L water-filled container is illustrated in FIGS. 2A-2E. FIG. 2A is an image of a rover, with the structure of the rover outlined in FIG. 2B for sizing. FIG. 2C is a graphical representation of the resulting rover structure. By placing this in a box as shown in FIG. 2D, the size (i.e., dimensions and volume) of the surrogate container can be estimated as in FIG. 2E.

FIGS. 3A and 3B are images of the 22.7 L water-filled container that was used as the rover surrogate for testing. A wooden board was mounted on top of the container as part of the tip or rollover safeguard assembly (or protection mechanism). The safeguard prototype was made with structural members formed out of thick copper tubes screwed onto the wooden board. The structural members can have a circular or other geometric (e.g., rectangular, triangular, polygonal, elliptical or oval) cross-section. The protection mechanisms can be fabricated from a wide range of metallic or metal alloy tubing such as, but not limited to, copper, steel, chromium, aluminum, titanium, etc., non-metallic materials, such as, but not limited to, rubber, carbon fibers, thermoplastics, etc., or a combination thereof. In some implementations, solid bars (e.g., shaped rods or T-bars) or filled tubing can be used.

Figure 5A:
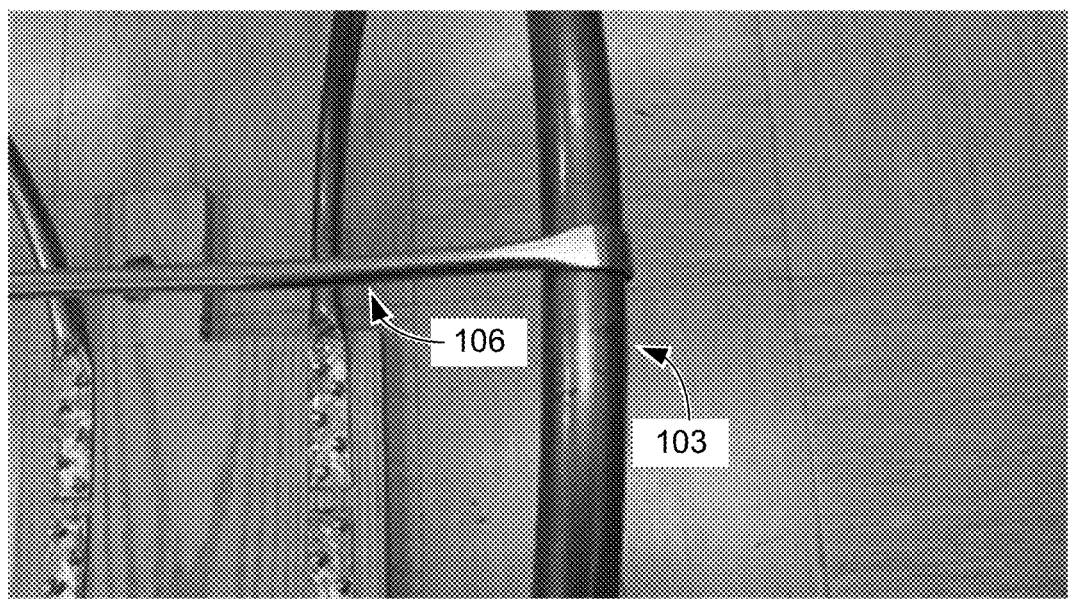
FIGS. 5A-5E are images of an example of a tip or rollover protection (or safeguard) mechanism with cross beams or struts for additional support, in accordance with various embodiments of the present disclosure.
Figure 5B:
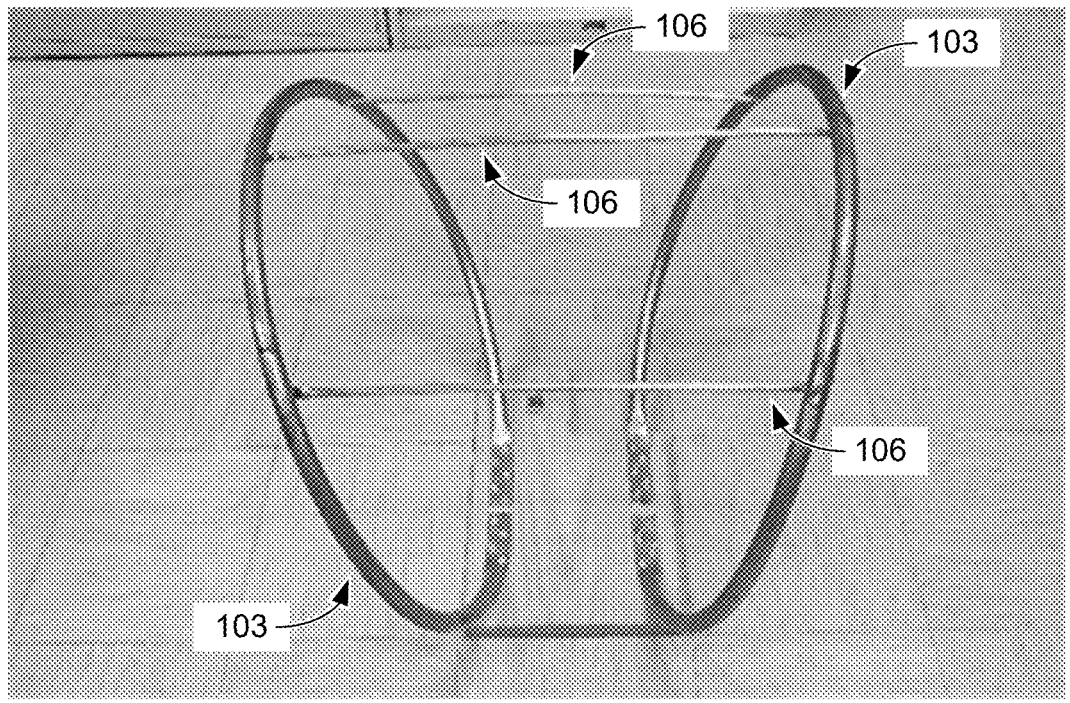
Figure 5C:
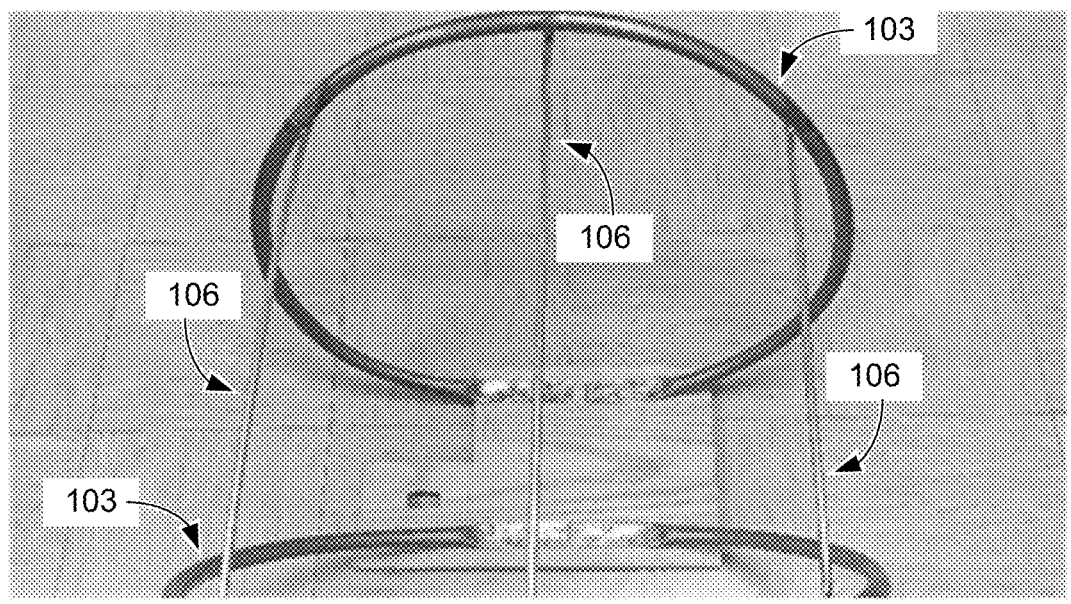
Figure 5D:
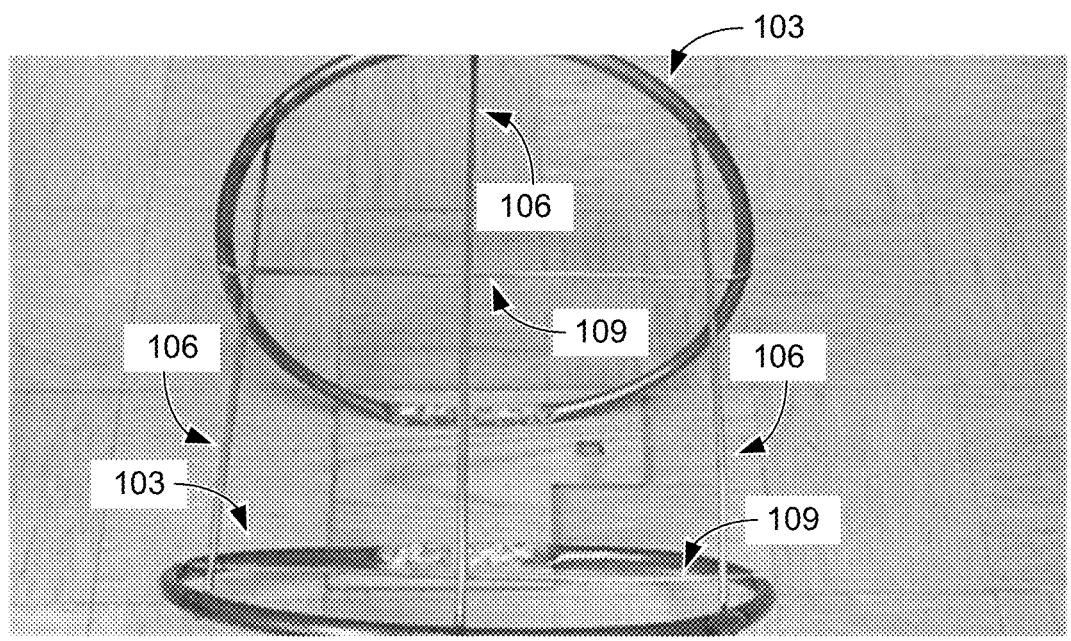
Figure 5E:
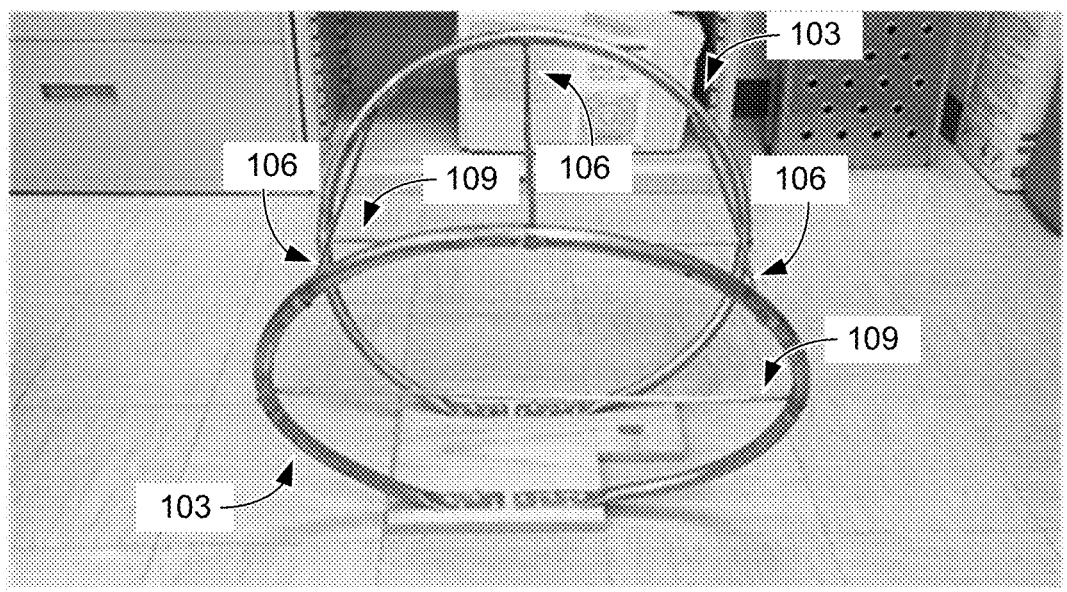
Figure 6:
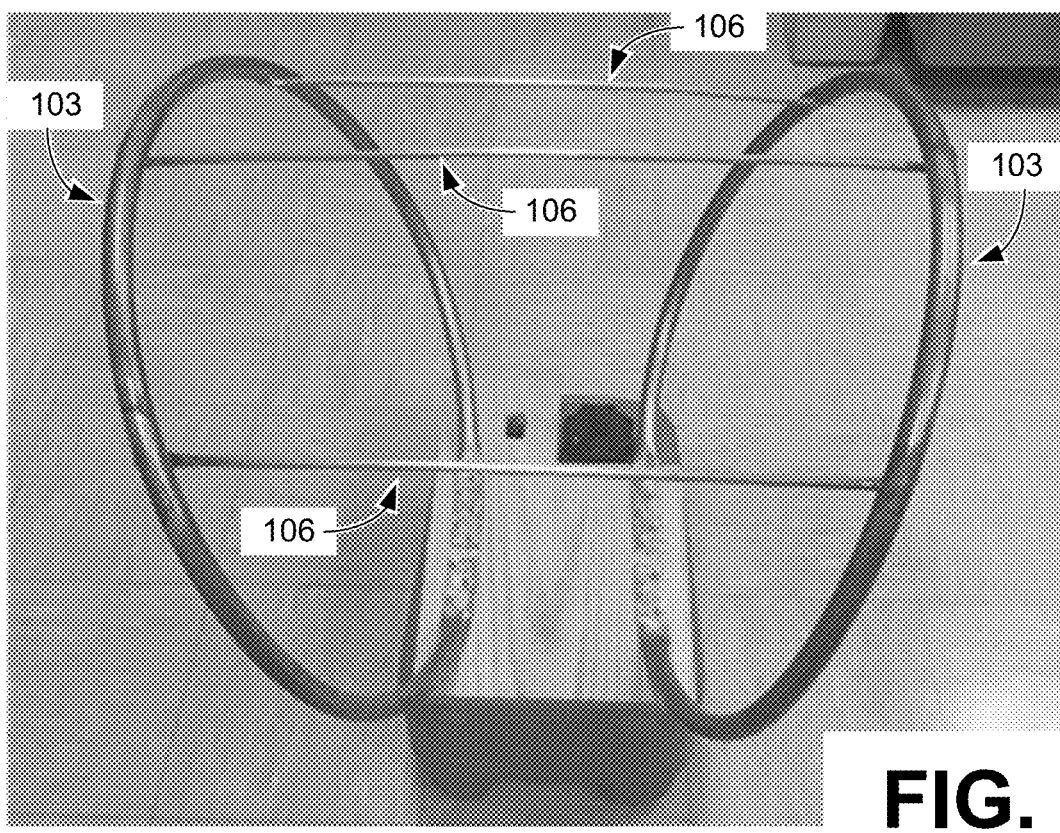
FIG. 6 is an image of the water-filled container including an example of the tip or rollover protection (or safeguard) mechanism of FIGS. 5A-5C positioned on the container, in accordance with various embodiments of the present disclosure.

An example of a safeguard style is illustrated in FIG. 4. The example of the tip or rollover protection mechanism is shown with two structural members 103 extending between front and rear portions of the frame. This preliminary safeguard shape was constructed from copper tubes (19 mm in diameter), and can bend along the width of the rover (i.e., the ring-shaped guards can be pushed together or pulled apart depending on the impact forces) or collapse inward if the impact forces are overwhelming. To mitigate these weaknesses, several cross-stabilizing beams and/or struts and internal supports were soldered in place as shown in FIGS. 5A-5E with the objectives of maintaining constant width between rings, maintaining overall ring curvature, and preventing the individual rings from bending inwards under high stress. FIGS. 5A-5C show an example of protection mechanisms including cross beams 106 extending between structural members 103. FIGS. 5D and 5E show an example of an internal support 109 coupled between front and rear sides of the structural member 103. FIG. 6 is an image showing an example of a prototype of the tip or rollover safeguard with structural members 103 extending between front and rear portions of the frame, which can be augmented with cross beams and struts for additional support. The resulting tip or rollover safeguard was fastened to the water-filled container, i.e., rover surrogate, via steel zip ties as shown in FIGS. 7A and 7B.

Figure 8B:
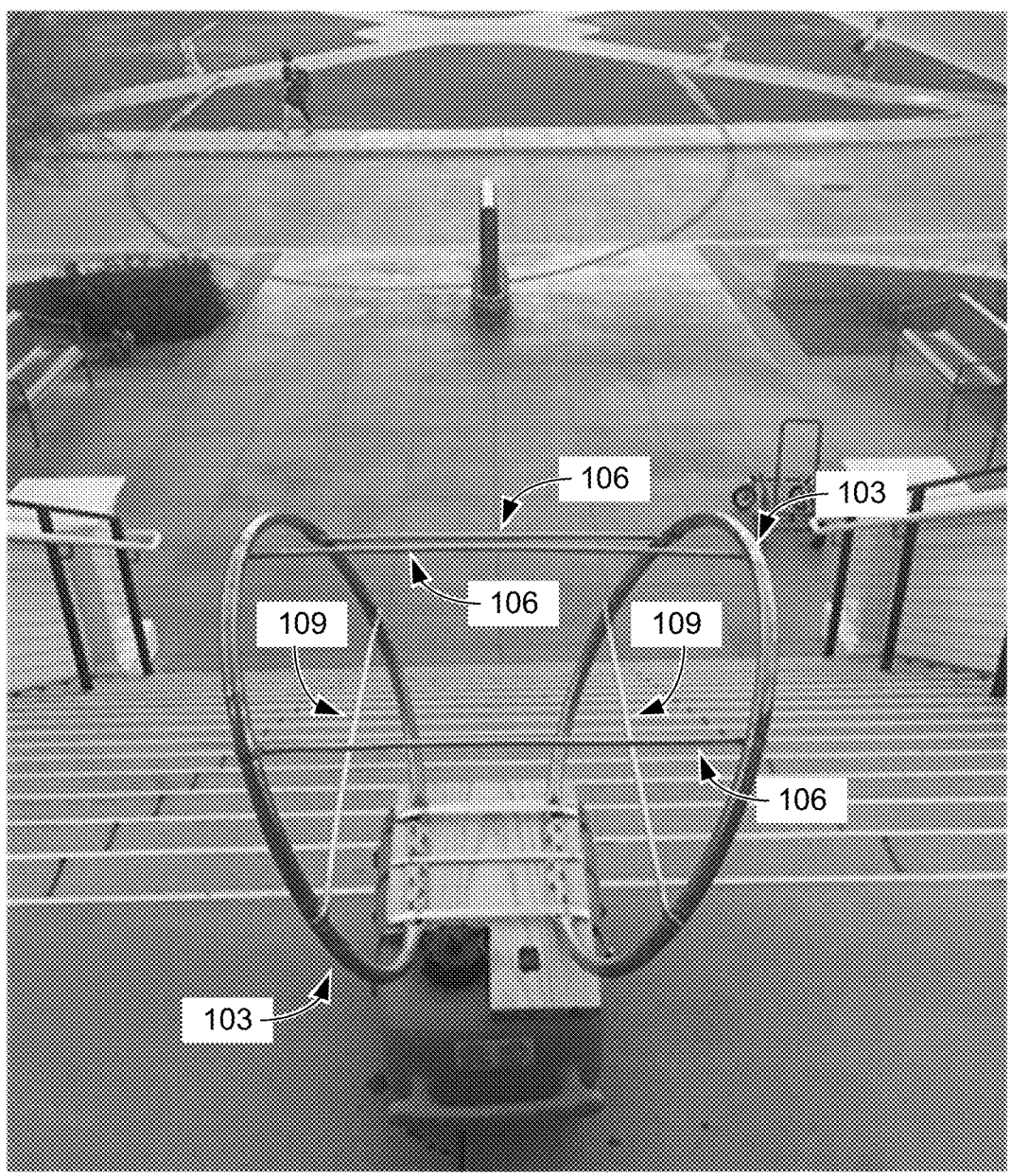

The effectiveness of the chosen safeguard design was tested by pushing the safeguard-equipped rover surrogate in FIGS. 7A and 7B down a long and steep flight of stairs, ensuring that the rover dummy made at least one full rotation to experience at least the full mass of the rover surrogate. FIG. 8A is an image of the flight of stairs from the bottom and FIG. 8B is an image of the rover surrogate, including protection mechanisms with structural members 103 extending between front and rear portions of, and curving over the frame, in position at the top of the stairs prior to testing.

Down Slope Tumble Experiment Results

Down Slope Tumble Experiment. Two consecutive down slope tumble experiments were conducted on a long and steep flight of stairs shown in FIGS. 8A and 8B. Both experiments were documented with an iPhone in SLO-MO video mode. Only the results of the second experiment are shown here as a sequence of selected video frames in FIGS. 9A-9J capturing the down slope tumble path and landing of the rover surrogate of FIGS. 7A and 7B.

Figure 9A:
FIGS. 9A-9J are images of a second down slope tumble test of the rover surrogate of FIGS. 7A and 7B, in accordance with various embodiments of the present disclosure.
Figure 9B:
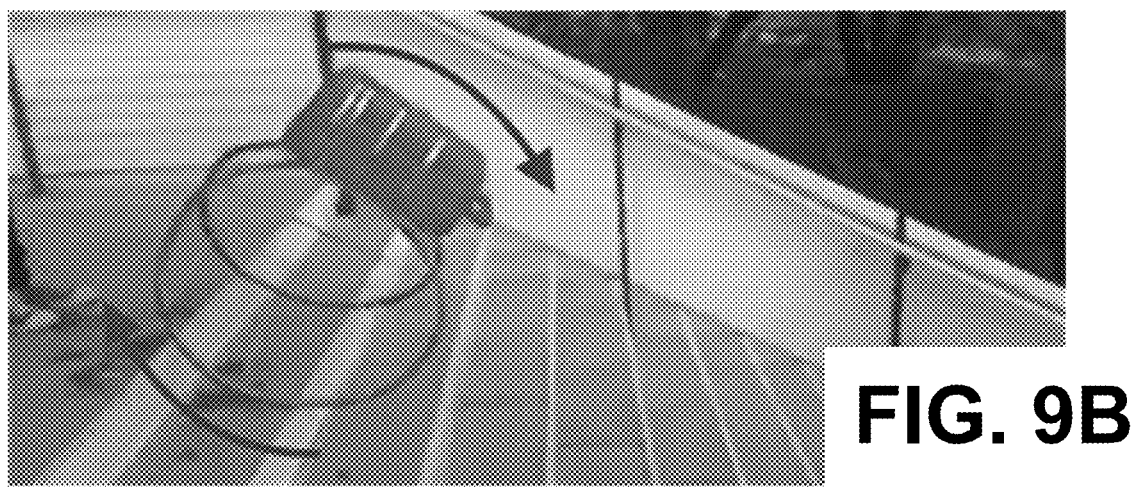
Figure 9C:
Figure 9D:
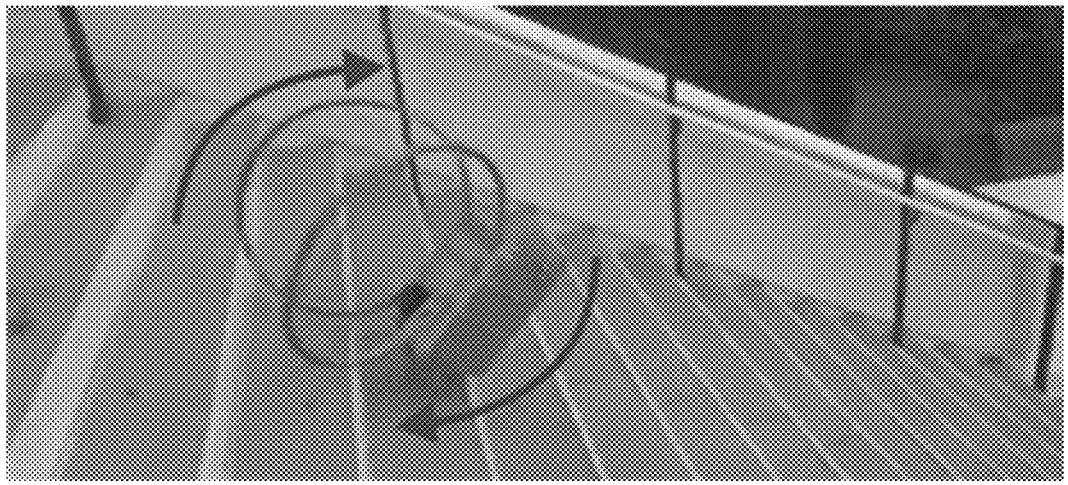
Figure 9E:
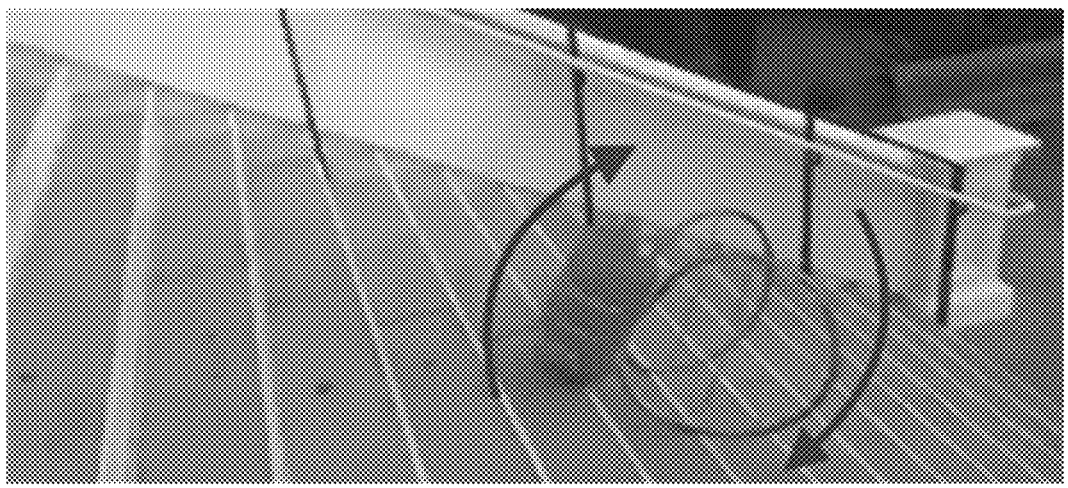
Figure 9F:
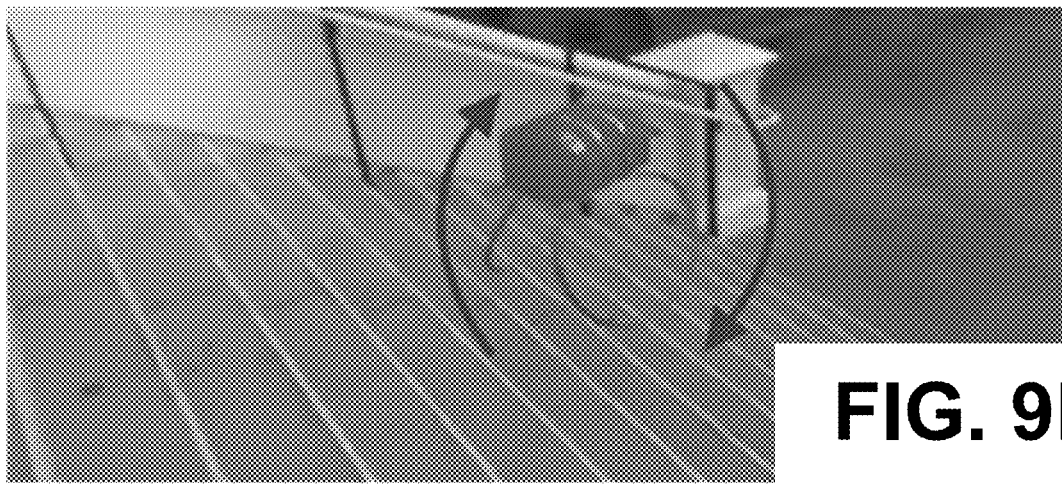
Figure 9G:
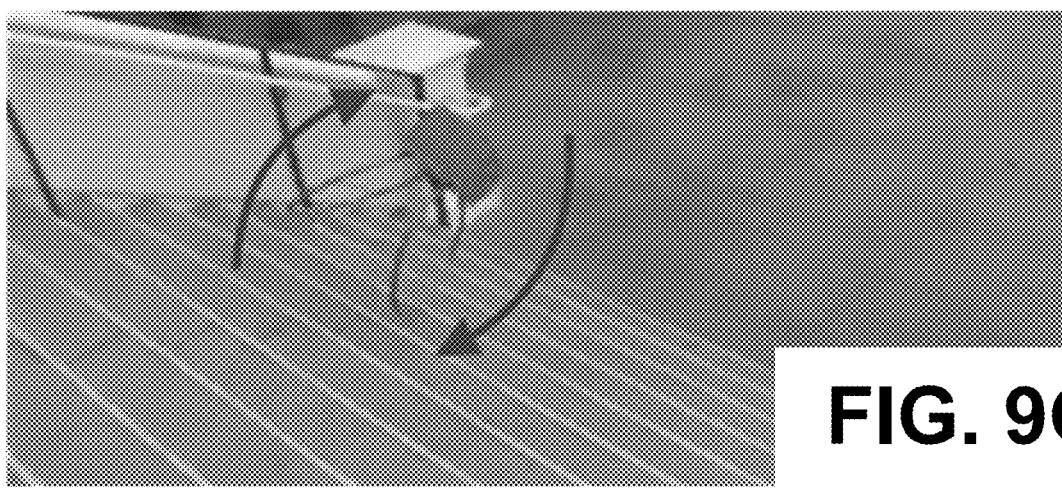
Figure 9H:
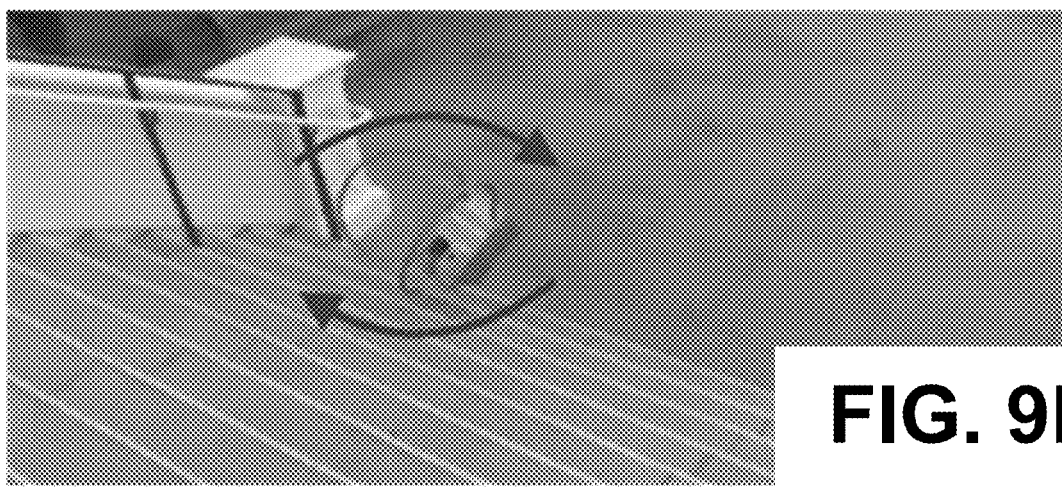
Figure 9I:
Figure 9J:
Figure 10A:
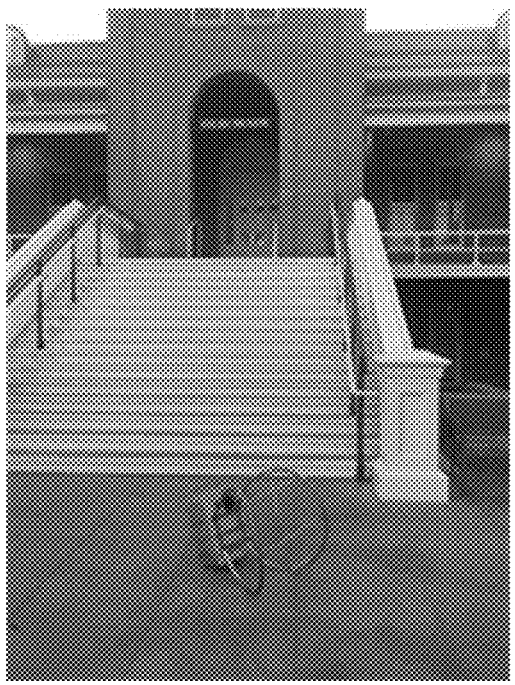
FIGS. 10A-10D are images of the final position of the rover surrogate after the second down slope tumble test, in accordance with various embodiments of the present disclosure.
Figure 10B:
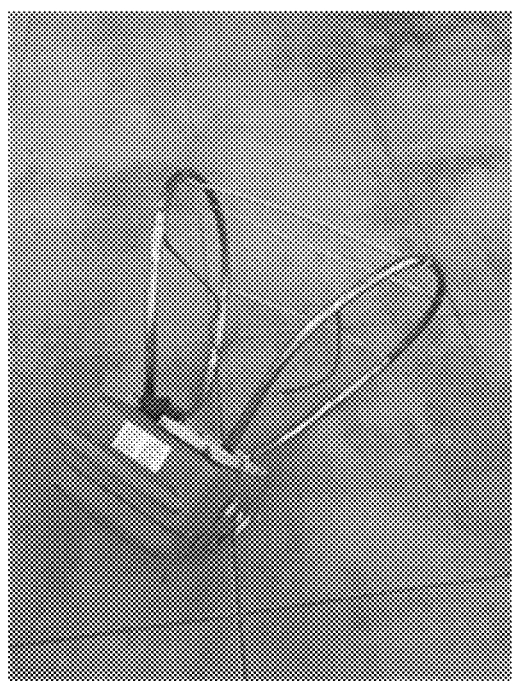
Figure 10C:
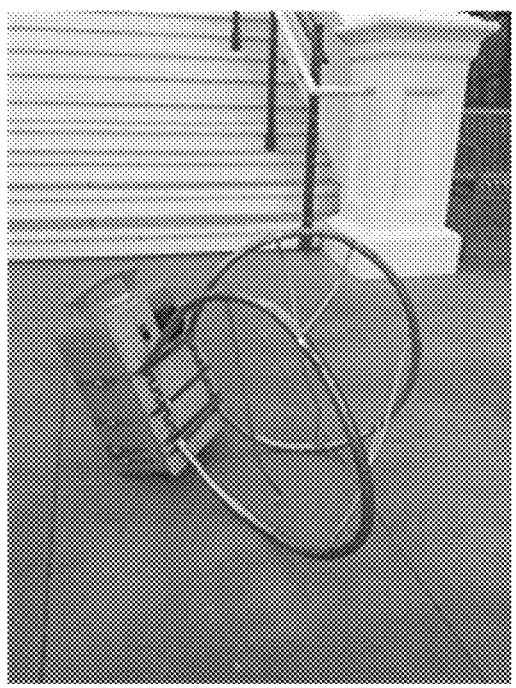
Figure 10D:
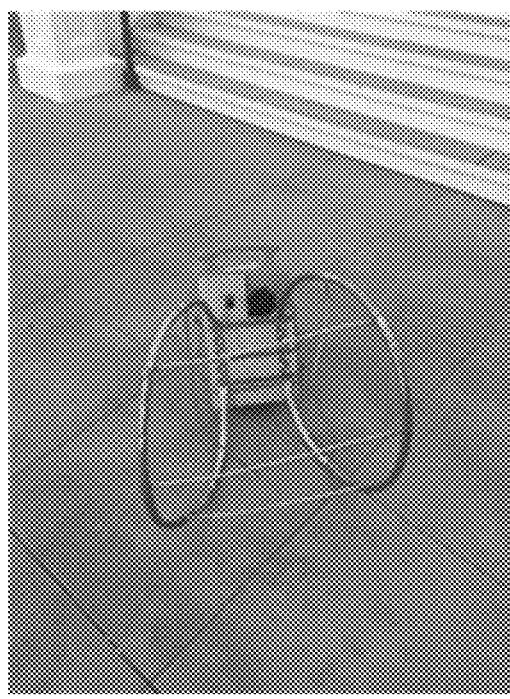

The safeguard (or protection mechanism) minimized the falling damage to the full-scale rover model from the simulated unsuccessful traversal of a high-risk site after two complete rotations, including a complete lift-off from the surface of the stairs as shown in FIGS. 9F and 9G. While not perfect, the landing position of the rover surrogate in FIG. 9J and FIGS. 10A-10D is encouraging, and may indicate that this down slope tumbling could have been completely recoverable, i.e., rover surrogate landing right side up for continued operation.

Figure 11A:
FIGS. 11A-11D are images illustrating damage incurred by the active tip or rollover protection (or safeguard) mechanism from the second down slope tumble testing, in accordance with various embodiments of the present disclosure.
Figure 11B:
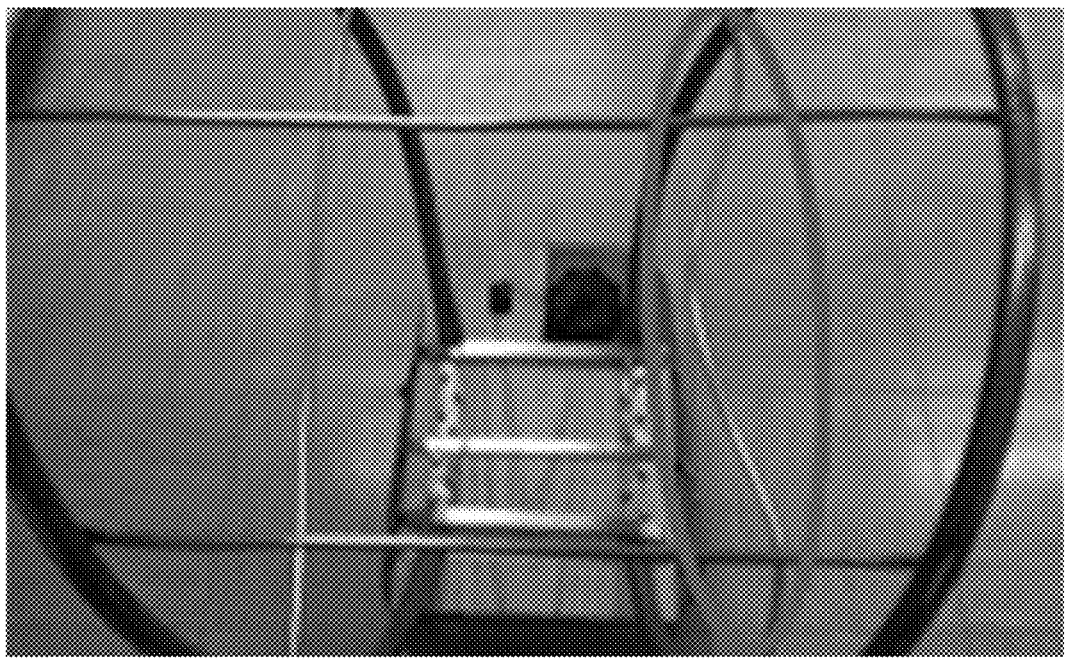

Aftermath—Incurred Deformation & Damage. After a total of two consecutive roll down tests, the protection safeguard sustained deformations and damage to the cross-beams and internal supports (e.g., struts) as seen in FIGS. 11A-11D. One beam was detached from the prototype in FIG. 11D, which can likely be attributed to poor soldering. Structural deformities also occurred at the base of the copper tubes in FIG. 11C, where the safeguard was zip-tied to the full-scale model rover (or rover surrogate). In more detail, the following deformations and damages were incurred:

Deformation (ripples) on one of the cross beams of the safeguards are highlighted in FIGS. 11A and 11B (with the aim of preventing each safeguard from being squashed from the top): this implies that the beams also protected the safeguards, to an extent, from being squashed horizontally as well.

Figure 11C:
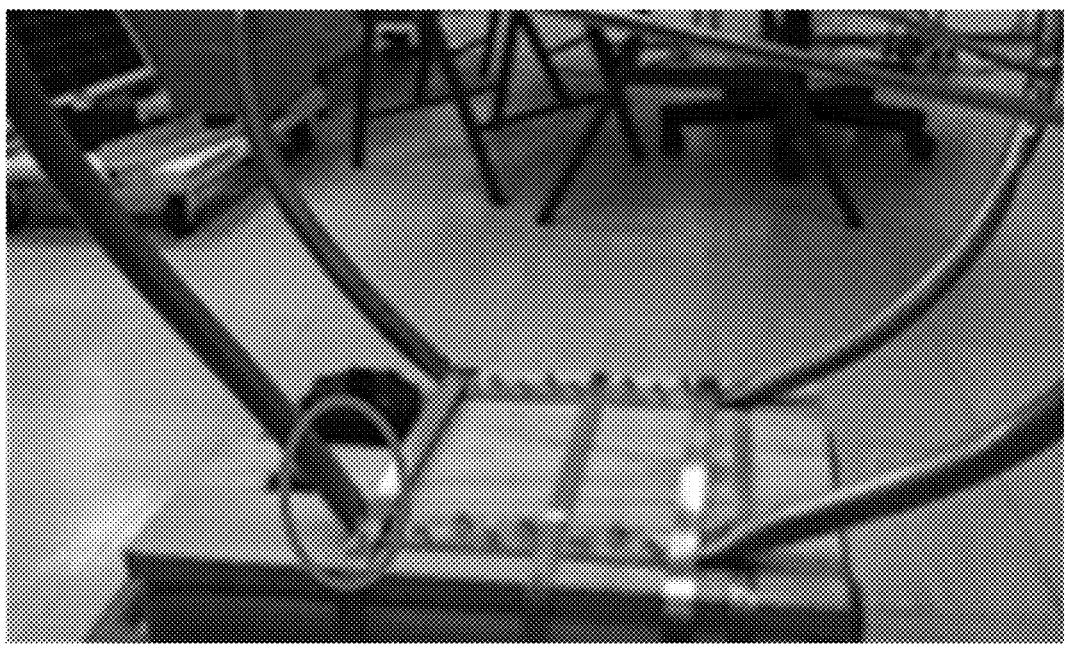

Deformation at the point in which one of the safeguards was fastened to the wooden board in FIG. 11C resulted from the rover landing almost vertically, i.e., nose-forward. The reason for only one such deformation may be because, at that point, the safeguard's curvature was too narrow (i.e., too small of a curvature radius) or sudden with respect to the mounting on the wooden board compared to the other safeguard.

Figure 11D:
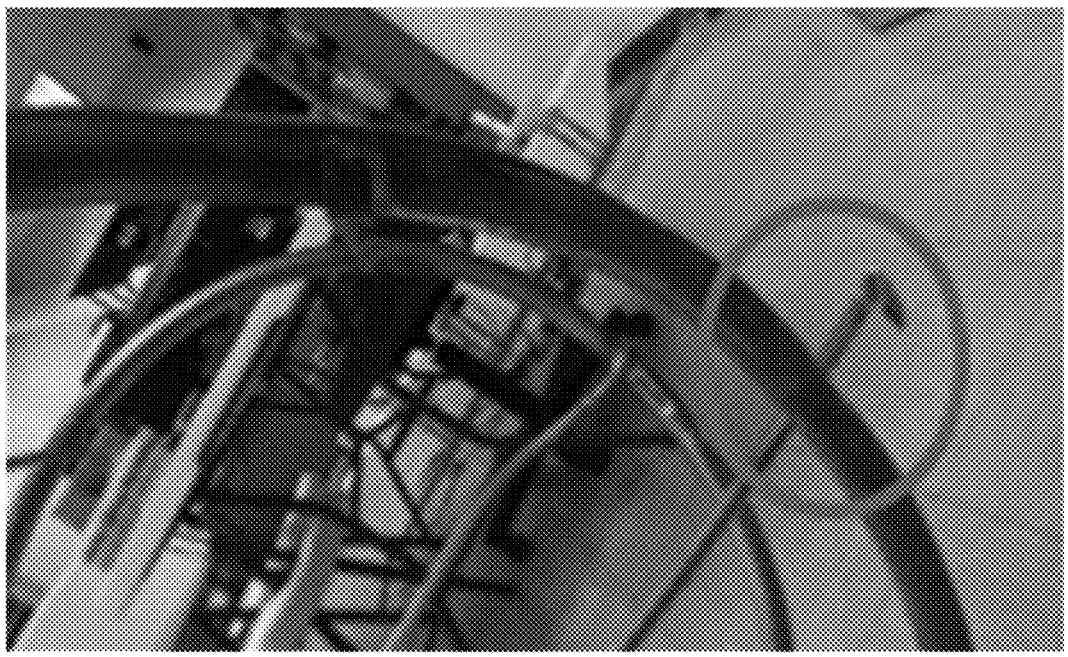

Detachment of one of the cross beams, connecting the safeguards, is shown in FIG. 11D. This is most likely due to poor soldering. Nevertheless, these particular cross beams prevented the safeguards from wobbling/flapping during the down slope tumbling, and from spreading horizontally (i.e., away from each other) upon landing.

As a result of the conducted down slope tumble experiments, the following modifications can be used to enable a rover safeguard to survive several impacts during a planetary surface exploration mission through high-risk terrain:

Because deformations to the copper safeguard were observed, the safeguards (or protection mechanisms) can be constructed out of a more durable material (e.g., titanium, or carbon fiber).

Cross beams/struts can be properly soldered for enhanced stability.

Stronger tubular materials can be used for the cross-stabilizing beams/struts to maintain the integrity/shape of each safeguard, i.e., to protect each safeguard from being squashed upon impact, since deformations were observed.

Figure 12:
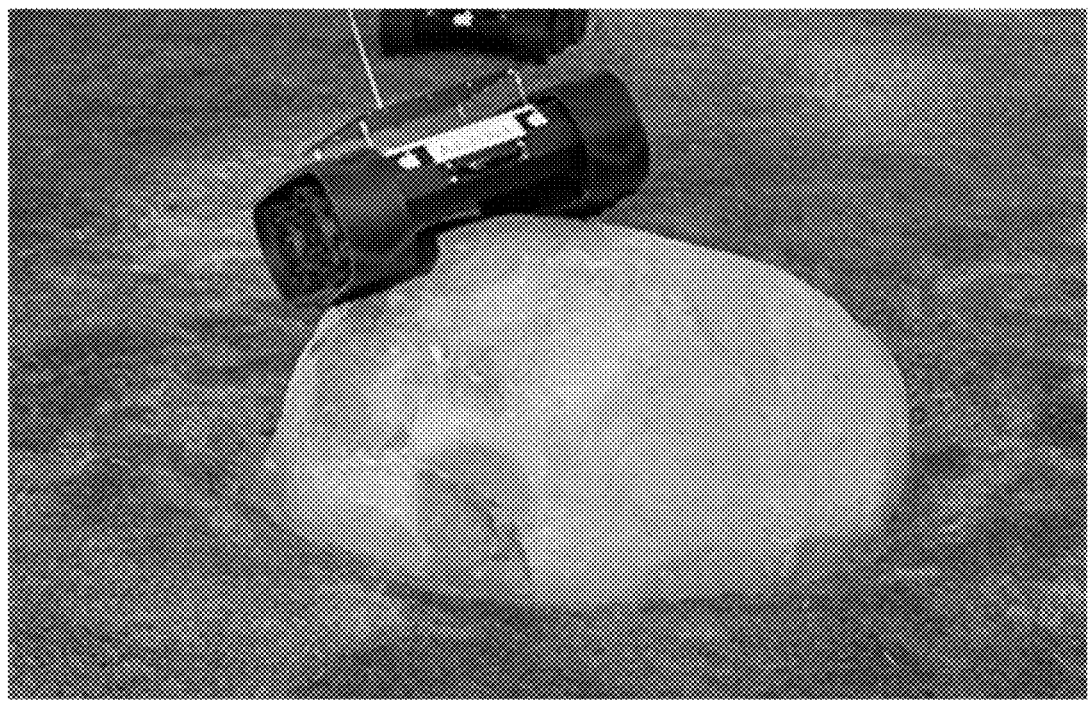
FIG. 12 is an image of a rover platform negotiating a boulder that is larger than the rover with a significant tip or rollover risk, in accordance with various embodiments of the present disclosure.

The safeguards can extend further out (i.e., away from the body of the rover) to ensure effective protection in situations where the rover has to climb relatively steep slopes as illustrated in the image of FIG. 12. However, in order to maintain proximity/access to surface targets, the upward curvature can start right at the edge of the rover.

Common to the passive and active tip or rollover protection mechanism examples presented in this disclosure (FIGS. 1A-1F) is the fact that they are not actuated, i.e., not extendable or retractable, nor actively deformable to actively guide a tip or rollover event over its entire duration (potentially with active sensor feedback, e.g., pertaining to vehicle attitude in 3D and terrain/environment). Actuated/extendable vehicle roll-over protection mechanisms are known in the automotive industry and are also being pursued in industrial vehicles, e.g., agricultural vehicles, such as tractors. From a planetary rover perspective though, any additional moving or deployable part/system represents potentially a further operational complication of the mission and poses potentially an additional risk or failure mode. As such, non-actuated passive/active roll-over protection mechanisms presented in this disclosure may strike a viable balance between enhanced rover safety and operational mission risk. Other passive and active tip or rollover protection mechanisms and designs, both actuated and non-actuated (or mixed), are known to those skilled in the art.

In some implementations, actuated tip or rollover protection mechanisms can be utilized or may be preferred and/or advantageous. The protection mechanisms can be configured to react to the surroundings as the vehicle is tipping or rolling over to aid in the restoration of the vehicle's orientation. The protection mechanisms can be designed to flex in response to obstacles that are encountered while the vehicle is tipping or rolling over, and can be capable of returning to the original shape thereby providing a force to restore the vehicle to the desired position. Appropriate materials and configurations can be used in the protection mechanisms to allow them to flex or deform and return to the original shape or substantially the original shape.

Figure 13A:
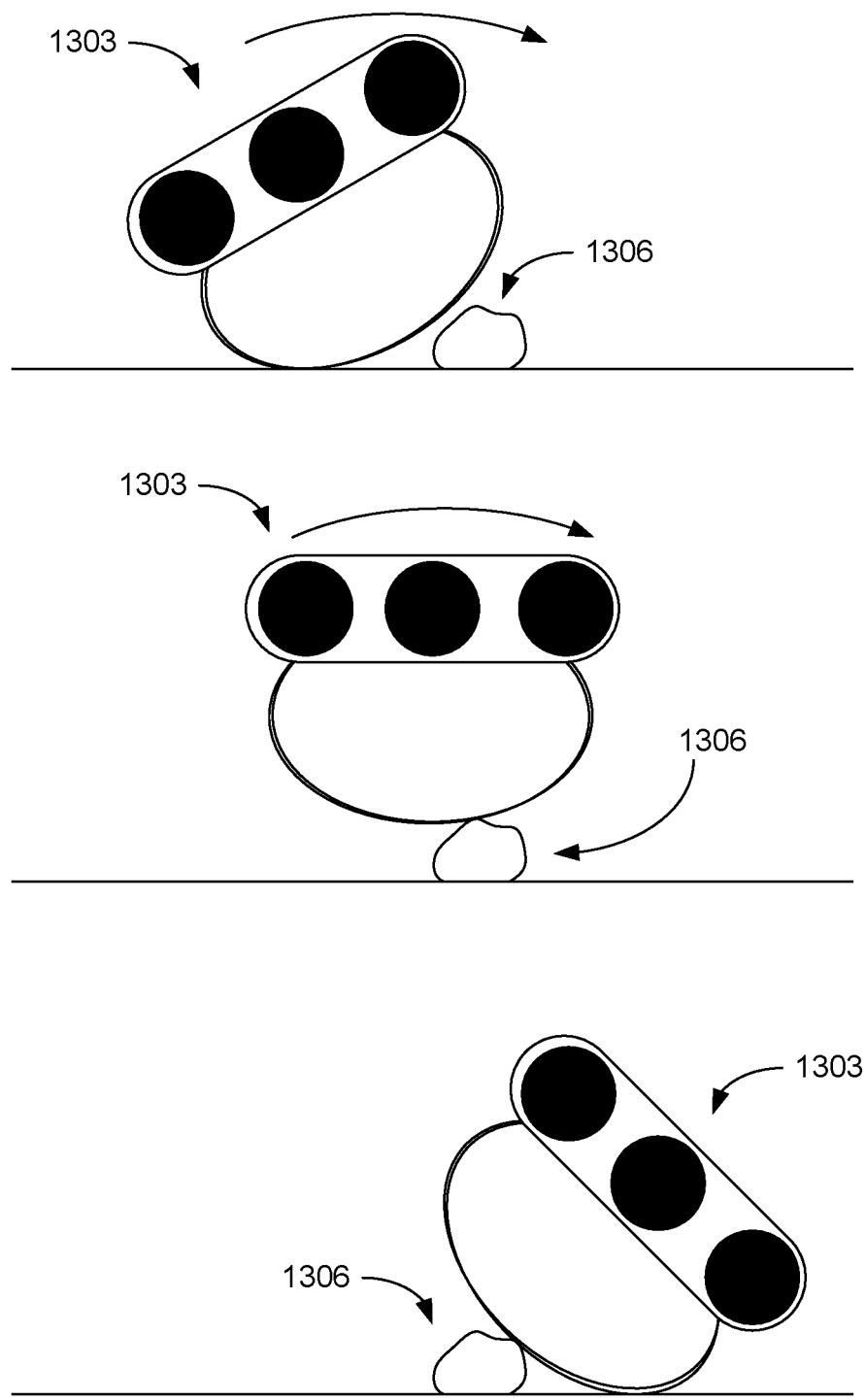
FIGS. 13A-13C illustrate examples comparing active and actuated protection (or safeguard) mechanisms, in accordance with various embodiments of the present disclosure.
Figure 13B:
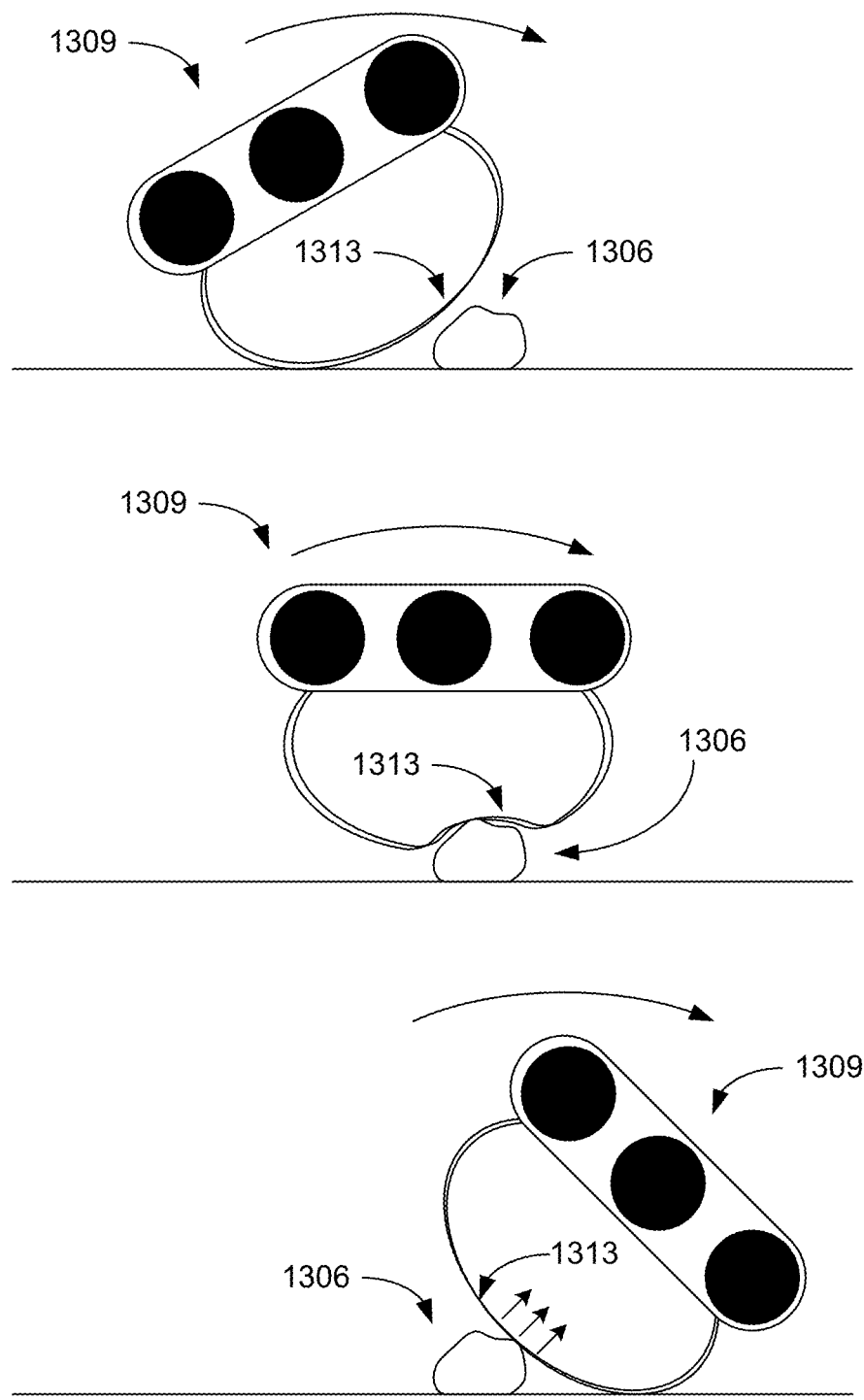
Figure 13C:
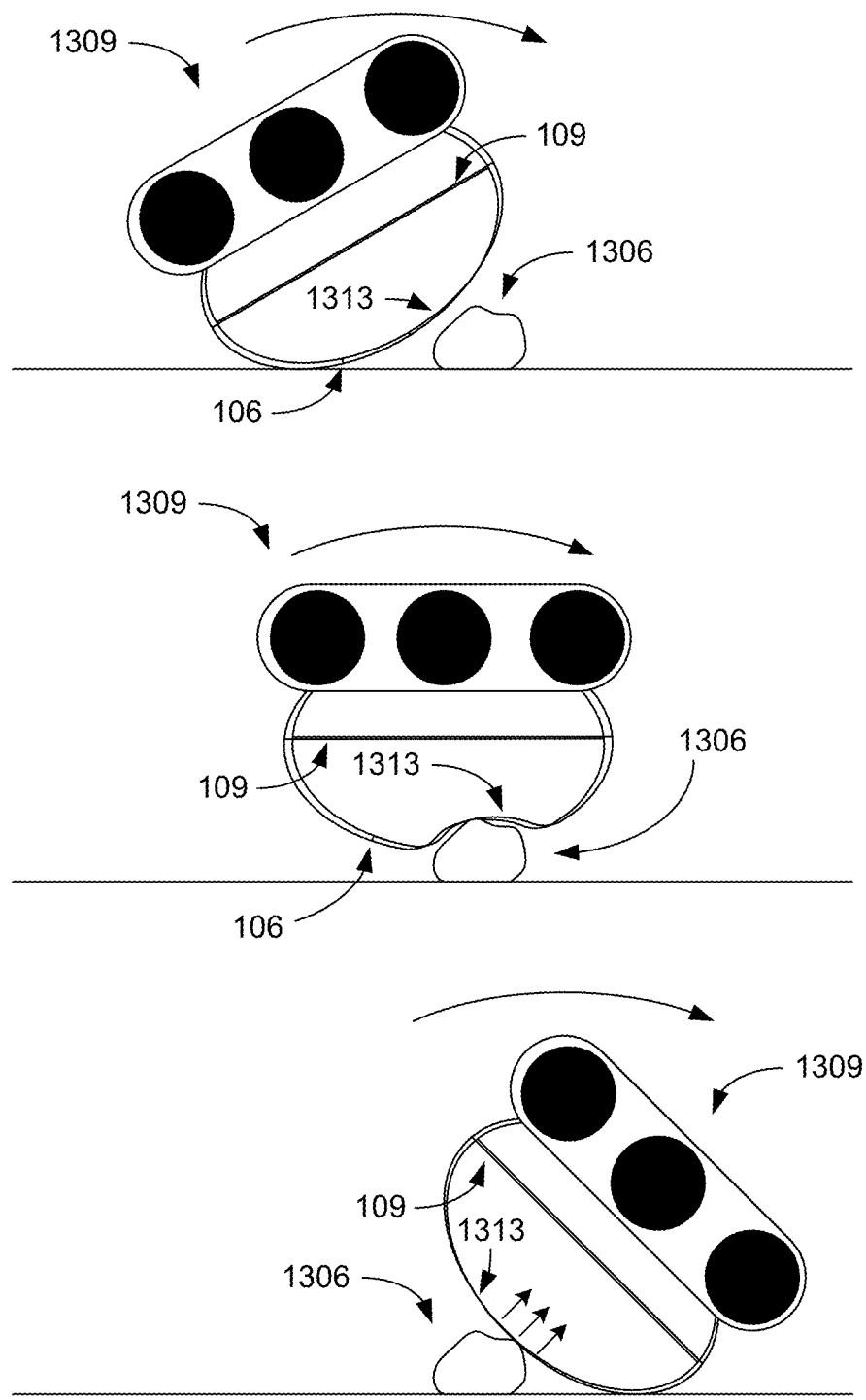

Referring to FIGS. 13A-13C, illustrated is an are examples of active vs. actuated protection mechanisms. FIG. 13A shows a vehicle 1303 with active protection mechanisms in a rollover condition. In the top view, the vehicle 1303 is in the process of rolling over on the ground surface with the vehicle supported by the protection mechanism. In this case, a ground obstacle 1306 is present in the path of the rollover. As the vehicle 1303 continues to roll over, the active protection allows the vehicle 1303 to roll over the ground obstacle 1306 as shown in the middle view. However, if sufficient energy is given up or dissipated as the vehicle rolls over the obstacle 1306, the vehicle 1303 may end its roll in a position without returning the vehicle 1303 to an upright condition as shown in the bottom view of FIG. 13A. Other outcomes are possible.

FIG. 13B shows a vehicle 1309 with actuated protection mechanisms 1313 in a similar rollover condition. In the top view, the vehicle 1309 is again in the process of rolling over on the ground surface with the vehicle supported by the protection mechanism. Because of the actuated protection mechanisms, the protection mechanisms can flex or deform as the vehicle 1309 continues to roll over the ground obstacle 1306 as shown in the middle view. By flexing or deforming, the actuated protection mechanisms 1313 can store energy while reducing the amount of energy used to get over the ground obstacle 1306. As the vehicle 1309 rolls over the obstacle 1306, the actuated protection mechanisms 1313 can return to their original shape (or substantially their original shape) imparting a force from the stored energy to allow the vehicle 1309 to continue rolling as shown in the bottom view. The force imparted by the actuated protection mechanisms 1313 can help the vehicle 1309 to continue to roll back to its upright position. FIG. 13C shows an example of the actuated protection mechanisms 1313 with cross beams 106 and internal supports 109.

As opposed to passive and active protection mechanisms, actuated protection mechanisms can actively guide, steer, alter, or direct tip or rollover events throughout parts or the entire duration of the events, with the goal of optimizing the outcome, i.e., placing the ground vehicle in a position/attitude for continued operation after the tip or rollover event. In one embodiment, sensors onboard a ground vehicle may be used to assess the ground vehicle attitude in 3D space and/or its dynamic state, e.g., rotational velocity, angular rate, etc. Examples of sensors for attitude assessment of a ground vehicle may comprise, but are not limited to, inertial measurement units (IMUs), magnetometers, gyroscopes, Global Positioning Systems (GPS) in the case of Earth-based ground vehicles, etc. Examples of sensors for dynamic state assessment of a ground vehicle may comprise, but are not limited to, accelerometers, IMUs, gyroscopes, pitot tubes, etc. In yet another embodiment, sensors along the protection mechanisms may sense characteristics, such as, but not limited to, terrain topology, terrain roughness, terrain evenness, terrain unevenness, terrain/floor/ground stiffness/softness, and/or obstacles in the path of the tip or rollover event. Examples of sensors for assessing these terrain-related characteristics may comprise, but are not limited to, pressure sensors, optical sensors, laser range finders, Light Detection and Ranging (LIDAR), radar, ultrasound, lasers, penetrating probes, probes to assess stiffness/softness, etc.

Based on and/or in response to the sensor information (e.g., delivered by at least one sensor), the actuated protection mechanisms may, e.g., flex, deform, contract, expand, retract, deploy, shape-change, or adapt to the sensed/assessed attitude of the ground vehicle, dynamic state of the ground vehicle, environment/terrain/floor/ground encountered during the tip or rollover event, or any combination of the foregoing. In some implementations, sensors can be used to actively sense changes in the shape of the protection mechanisms. For example, the protection mechanisms can include sensors such as strain gauges, piezoelectric cells, etc. to detect changes when obstacles are encountered during tip or rollover of the vehicle. Some of these flexing, deforming, contracting, expanding, retracting, deploying, shape-changing, or adapting processes can be effectuated by, e.g. bi-metals (potentially electrically controlled); pneumatic systems (e.g., inflating or deflating a tube with gas or vacuum); hydraulic systems (e.g., using oil or other liquids); dilatant fluids or solutions, also known as shear thickening fluids or solutions, whose viscosity increases as stress is applied (e.g., used in body armor); pulleys; belts; chains; inch worms; micro-actuators; Micro-Electro-Mechanical Systems (MEMS) based micro-actuators; rods; springs; oil- or gas-filled dampers or shock absorbers; thermoplastic or thermosoftening plastic (i.e., plastic polymer material that becomes pliable or moldable at a certain elevated temperature and solidifies upon cooling); etc. Other mechanisms effectuating flexing, deforming, contracting, expanding, retracting, deploying, shape-changing, or adapting processes can also be utilized.

Rover protection mechanisms or safeguards as presented in this disclosure (or derivatives thereof) could be especially beneficial, e.g., when paired with an exploration paradigm that directs multiple autonomous agents (e.g., the Tier-Scalable Reconnaissance mission architecture), thereby employing multiple, expendable rovers to allow for more aggressive exploration of hazardous terrain for maximized science return. The protection mechanisms and safeguards can also provide benefits to autonomous or remotely controlled vehicles, such as, but not limited to, those produced by the robotic and toy industries. For example, they can be applied to smaller radio-controlled vehicles to protect from rollover during operation or during robotic swarming, i.e., the simultaneous deployment and operation of multiple robotic vehicles. The protection mechanisms can also be utilized for other types of ground vehicles such as, e.g., automobiles, etc.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A vehicle for traversing a surface in an operational orientation, comprising:
    a vehicle frame;
    at least two protection mechanisms secured to the vehicle frame, each of the at least two protection mechanisms comprising a structural member extending between front and rear portions of the vehicle frame and curving over the vehicle frame, wherein the structural members comprise actuated protection mechanisms configured to react to surroundings during tip or rollover of the vehicle from the operational orientation, where the reaction aids in restoration of orientation of the vehicle to the operational orientation, wherein the actuated protection mechanisms flex in response to obstacles encountered during tip or rollover of the vehicle, and provide a force aiding in restoration of the operational orientation of the vehicle as the actuated protection mechanisms flex back.

2. The vehicle of claim 1, where the vehicle is a ground vehicle.

3. The vehicle of claim 1, where the at least two protection mechanisms are secured to opposite sides of the vehicle frame.

4. The vehicle of claim 3, wherein the at least two protection mechanisms secured to opposite sides of the vehicle frame consists of a pair of protection mechanisms secured to opposite sides of the vehicle frame.

5. The vehicle of claim 3, wherein the structural members of the at least two protection mechanisms are secured on opposite sides of the vehicle frame in a V-shape.

6. The vehicle of claim 1, wherein the structural member comprises metallic tubing or metal alloy tubing.

7. The vehicle of claim 6, wherein the metallic tubing comprises copper, steel, chromium, aluminum or titanium tubing.

8. The vehicle of claim 1, wherein the structural member is formed of carbon fiber.

9. The vehicle of claim 1, wherein the structural member has a circular cross-section.

10. The vehicle of claim 1, wherein the structural member has a geometric cross-section.

11. The vehicle of claim 1, wherein flexing of the actuated protection mechanisms is adjusted based upon a sensed vehicle orientation.

12. The vehicle of claim 1, wherein each of the at least two protection mechanisms comprises internal support coupled between front and rear sides of the structural member.

13. A method for tip or rollover protection of a vehicle, comprising:

traversing a surface with the vehicle in an operational orientation, the vehicle comprising at least one protection mechanism secured across a frame of the vehicle, the at least one protection mechanism comprising a structural member extending between front and rear portions of the vehicle frame and curving over the vehicle frame;

sensing vehicle orientation during tip or rollover of the vehicle;

in response to the at least one protection mechanism encountering an obstacle during the tip or rollover of the vehicle from the operational orientation, flexing the at least one protection mechanism about the obstacle;

adjusting flexing of the at least one protection mechanism based upon the vehicle orientation; and providing, by the at least one protection mechanism, a force against the obstacle as the at least one protection mechanism flexes back, the force aiding in restoration of the vehicle to the operational orientation.

14. The method of claim 13, wherein the at least one protection mechanism flexes back to an original shape of the at least one protection mechanism.

15. The method of claim 13, wherein the at least one protection mechanism comprises an internal support coupled between opposite front and rear sides of the structural member.

16. The method of claim 13, where the at least one protection mechanism comprises at least two protection mechanisms secured to opposite sides of the vehicle frame.

17. The vehicle of claim 16, wherein the at least two protection mechanisms comprise structural members secured on opposite sides of the vehicle frame in a V-shape.

18. The method of claim 13, wherein the at least one protection mechanism consists of a pair of protection mechanisms secured to opposite sides of the vehicle frame.

19. The method of claim 13, wherein the structural member is formed of carbon fiber.

20. The method of claim 13, wherein the structural member has a circular cross-section or a geometric cross-section.

* * * * *